United States Patent
Choi et al.

(10) Patent No.: US 9,794,932 B2
(45) Date of Patent: Oct. 17, 2017

(54) METHOD AND DEVICE FOR TRANSMITTING AND RECEIVING TRAFFIC INDICATION MAP IN WIRELESS LAN SYSTEM

(71) Applicant: LG ELECTRONICS INC., Seoul (KR)

(72) Inventors: Jinsoo Choi, Anyang-si (KR); Hangyu Cho, Anyang-si (KR); Yongho Seok, Anyang-si (KR); Jeongki Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 14/426,098

(22) PCT Filed: Oct. 29, 2013

(86) PCT No.: PCT/KR2013/009670
§ 371 (c)(1),
(2) Date: Mar. 4, 2015

(87) PCT Pub. No.: WO2014/069869
PCT Pub. Date: May 8, 2014

(65) Prior Publication Data
US 2015/0230244 A1    Aug. 13, 2015

Related U.S. Application Data

(60) Provisional application No. 61/719,505, filed on Oct. 29, 2012, provisional application No. 61/719,957, (Continued)

(51) Int. Cl.
*H04W 72/04* (2009.01)
*H04W 72/12* (2009.01)
(Continued)

(52) U.S. Cl.
CPC ....... *H04W 72/0446* (2013.01); *H04L 1/1614* (2013.01); *H04L 12/4641* (2013.01);
(Continued)

(58) Field of Classification Search
None
See application file for complete search history.

(56) References Cited

U.S. PATENT DOCUMENTS

2005/0003794 A1  1/2005  Liu
2007/0036097 A1  2/2007  Costa et al.
(Continued)

FOREIGN PATENT DOCUMENTS

KR  10-2008-0083086  9/2008
WO  2012/096549      7/2012
WO  2012/134042      10/2012

OTHER PUBLICATIONS

Park, Minyoung, "Proposed Specification Framework for TGah", Sep. 2012, IEEE, IEEE 802.11-11/1137r11.*
(Continued)

*Primary Examiner* — Peter Chau
(74) *Attorney, Agent, or Firm* — Lee Hong Degerman Kang Waimey

(57) ABSTRACT

The present invention relates to a wireless communication system and, more specifically, to a method and a device for transmitting and receiving a traffic indication map (TIM) in a wireless LAN system. The method by which a station (STA) receives a TIM element in a wireless LAN system, according to one embodiment of the present invention, comprises the steps of: receiving a frame that includes the TIM element from an access point (AP); and decoding a partial virtual bitmap included in the TIM element, wherein one block of the partial virtual bitmap includes one or more association identifier difference value (ΔAID) fields, and a
(Continued)

field subsequent to the one or more ΔAID fields can indicate an end of the one block.

14 Claims, 19 Drawing Sheets

Related U.S. Application Data filed on Oct. 30, 2012, provisional application No. 61/721,498, filed on Nov. 2, 2012.

(51) Int. Cl.
*H04L 1/16* (2006.01)
*H04L 12/46* (2006.01)
*H04W 28/02* (2009.01)
*H04W 74/00* (2009.01)
*H04W 84/12* (2009.01)
*H04W 88/08* (2009.01)

(52) U.S. Cl.
CPC ... *H04W 28/0215* (2013.01); *H04W 72/1263* (2013.01); *H04W 74/002* (2013.01); *H04W 84/12* (2013.01); *H04W 88/08* (2013.01)

(56) References Cited

U.S. PATENT DOCUMENTS

| | | | |
|---|---|---|---|
| 2010/0265864 A1 | 10/2010 | He et al. | |
| 2013/0142184 A1* | 6/2013 | Wang | H04L 5/0053 370/338 |
| 2013/0294360 A1* | 11/2013 | Yang | H04W 24/02 370/329 |
| 2014/0010152 A1* | 1/2014 | Park | H04W 28/065 370/328 |
| 2014/0056232 A1* | 2/2014 | Park | H04W 28/0263 370/329 |
| 2014/0071900 A1* | 3/2014 | Park | H04W 74/04 370/329 |
| 2014/0204960 A1* | 7/2014 | Park | H04L 12/4633 370/474 |
| 2015/0029933 A1* | 1/2015 | Park | H04W 68/005 370/328 |

OTHER PUBLICATIONS

PCT International Application No. PCT/KR2013/009670, Written Opinion of the International Searching Authority dated Feb. 21, 2014, 16 pages.

Park, et al., "Proposed Specification Framework for TGah," IEEE 802.11-11/1137r12, XP002752673, Nov. 2012, 51 pages.

European Patent Office Application No. 13852112.5, Search Report dated Jan. 15, 2016, 6 pages.

PCT International Application No. PCT/KR2013/009670, Written Opinion of the International Authority dated Feb. 21, 2014, 12 pages.

* cited by examiner

FIG. 16
1 octet        0 - 8 octets
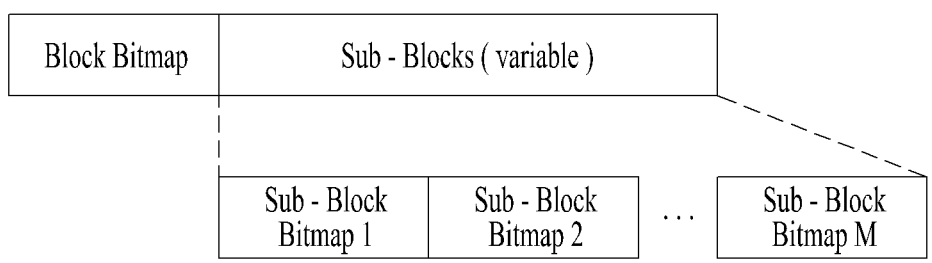
(a)
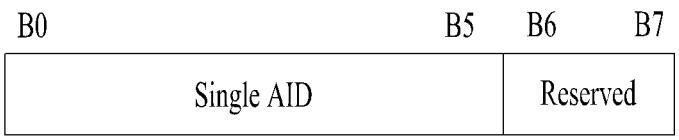
(b)
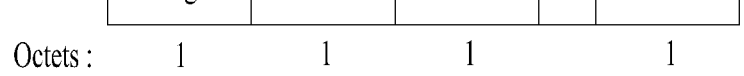
(c)

METHOD AND DEVICE FOR TRANSMITTING AND RECEIVING TRAFFIC INDICATION MAP IN WIRELESS LAN SYSTEM

CROSS-REFERENCE TO RELATED APPLICATIONS

This application is the National Stage filing under 35 U.S.C. 371 of International Application No. PCT/KR2013/009670, filed on Oct. 29, 2013, which claims the benefit of U.S. Provisional Application Ser. No. 61/719,505, filed on Oct. 29, 2012, 61/719,957, filed on Oct. 30, 2012 and 61/721,498, filed on Nov. 2, 2012, the contents of which are all hereby incorporated by reference herein in their entirety.

TECHNICAL FIELD

The present invention relates to a wireless communication system, and more particularly, to a method and apparatus for transmitting and receiving a Traffic Indication Map (TIM) in a Wireless Local Area Network (WLAN) system.

BACKGROUND ART

Along with the recent development of information and communication technology, various wireless communication technologies are under development. Among them, WLAN is a technology that enables wireless access to the Internet through a portable terminal such as a Personal Digital Assistant (PDA), a laptop computer, a Portable Multimedia Player (PMP), etc. in a home, an office, or a specific service area by radio frequency technology.

To overcome the limitations of WLAN in communication speed, the recent technology standards have introduced a system that increases network speed and reliability and extends the coverage of a wireless network. For example, Institute of Electrical and Electronics Engineers (IEEE) 802.11n adopts Multiple Input Multiple Output (MIMO) using multiple antennas at both a transmitter and a receiver in order to support High Throughput (HT) with a data processing rate of up to 540 Mbps, minimize transmission errors, and optimize a data rate.

DISCLOSURE

Technical Problem

Machine-to-Machine (M2M) communication is under discussion as a future-generation communication technology. IEEE 802.11 WLAN is also developing a technology standard for M2M communication as IEEE 802.11ah. For M2M communication, a scenario in which a small amount of data is transmitted at a low rate intermittently in an environment with a large number of devices may be considered.

An object of the present invention devised to solve the conventional problem is to provide a method for preventing errors during decoding of a partial virtual bitmap included in a TIM.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving a Traffic Indication Map (TIM) element by a Station (STA) in a Wireless Local Area Network (WLAN) system includes receiving a frame including a TIM element from an Access Point (AP), and decoding a partial virtual bitmap included in the TIM element. One block of the partial virtual bitmap includes one or more Association Identifier (ΔAID) Differential Value fields and a field following the one or more ΔAID fields indicates end of the one block.

In another aspect of the present invention, a method for transmitting a TIM element by an AP in a WLAN system includes encoding a partial virtual bitmap, and transmitting a TIM element including the encoded partial virtual bitmap to an STA. One block of the partial virtual bitmap includes one or more ΔAID fields and a field following the one or more ΔAID fields indicates end of the one block.

In another aspect of the present invention, an STA for receiving a TIM element in a WLAN system includes a transceiver, and a processor. The processor is configured to receive a frame including a TIM element from an AP through the transceiver, and to decode a partial virtual bitmap included in the TIM element, and one block of the partial virtual bitmap includes one or more ΔAID fields and a field following the one or more ΔAID fields indicates end of the one block.

In another aspect of the present invention, an AP for transmitting a TIM element in a WLAN system includes a transceiver, and a processor. The processor is configured to encode a partial virtual bitmap, and to transmit a TIM element including the encoded partial virtual bitmap to an STA through the transceiver, and one block of the partial virtual bitmap includes one or more Association Identifier (ΔAID) Differential Value fields and a field following the one or more ΔAID fields indicates end of the one block.

The followings are common in the embodiments of the present invention.

The field following the one or more ΔAID fields may be a padding bit.

The one block may include an Encoding Word Length (EWL) field, a Length field, the one or more ΔAID fields, and the padding bit.

The partial virtual bitmap may include one or more blocks and each of the one or more blocks may be encoded in an AID Differential Encode (ADE) mode.

Each of the one or more blocks may have a length of a plurality of octets.

The padding bit may have a value of 0.

If a ΔAID field other than a first ΔAID field among the one or more ΔAID fields has a predetermined value, the decoding may be stopped.

The predetermined value may be 0.

It may be determined whether data for the STA is buffered in the AP based on the partial virtual bitmap.

If an AID indicated by the partial virtual bitmap corresponds to an AID of the STA, it may be determined that data for the STA is buffered in the AP.

If it is determined that data for the STA is buffered in the AP, a frame requesting the data may be transmitted to the AP by the STA.

The frame including the TIM element may be a beacon frame.

The foregoing general description and following detailed description of the present invention are exemplary to provide an additional description of the present invention as claimed in the claims.

Advantageous Effects

According to the present invention, a method for preventing errors during decoding a partial virtual bitmap included in a TIM can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 16 illustrates exemplary encoded block information;

BEST MODE FOR CARRYING OUT THE INVENTION

Figure 1:
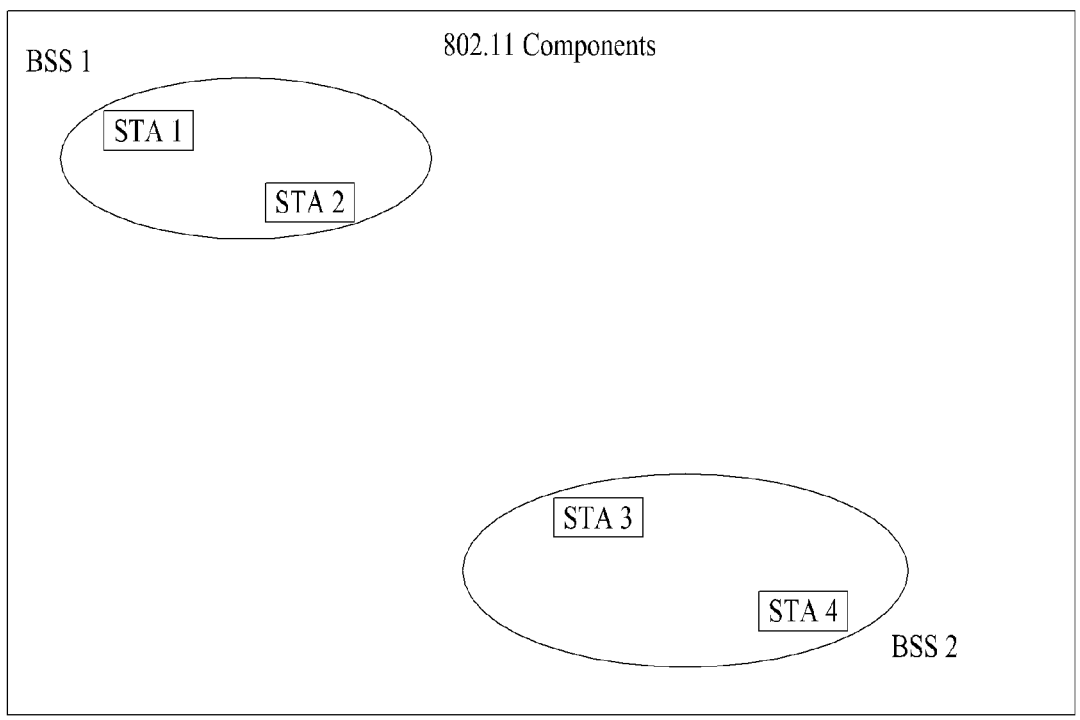
FIG. 1 illustrates an exemplary configuration of an Institute of Electrical and Electronics Engineers (IEEE) 802.11 system to which the present invention is applicable.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, known structures and devices are omitted or are shown in block diagram form, focusing on important features of the structures and devices, so as not to obscure the concept of the invention. Like reference numerals denote the same components throughout the specification.

The embodiments of the present invention may be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. While the embodiments of the present invention will be described below in the context of an IEEE 802.11 system for clarity of description, this is purely exemplary and thus should not be constructed as limiting the present invention.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 LAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 2:
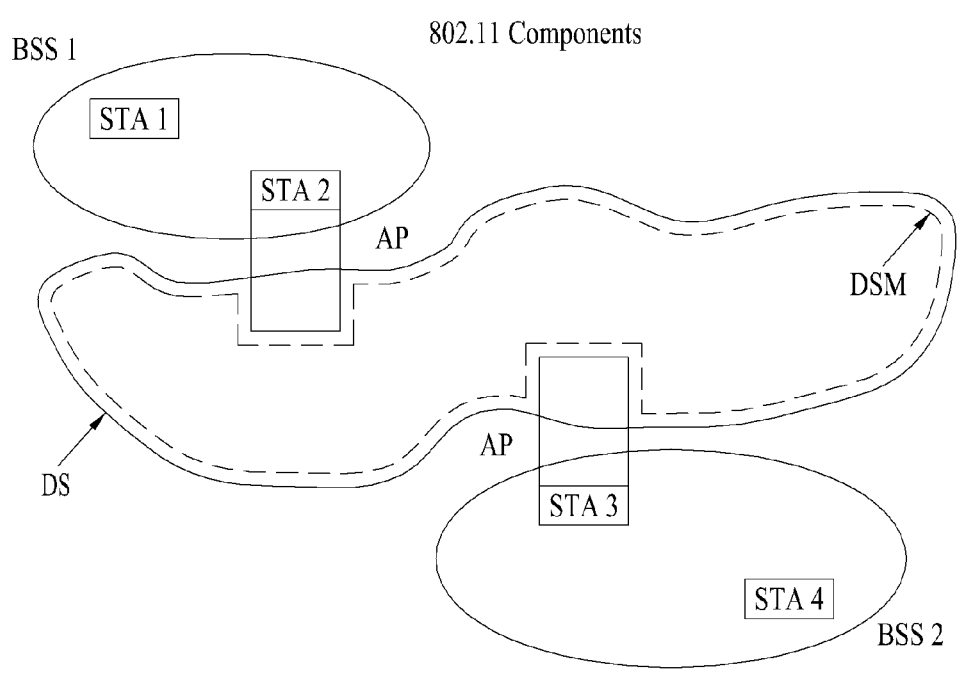
FIG. 2 illustrates another exemplary configuration of an IEEE 802.11 system to which the present invention is applicable.

FIG. 2 illustrates another exemplary configuration of the IEEE 802.11 system to which the present invention is applicable. In FIG. 2, components such as a Distribution System (DS), a Distribution System Medium (DSM), and an Access Point (AP) are added to the architecture illustrated in FIG. 1.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 1.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An AP is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Figure 3:
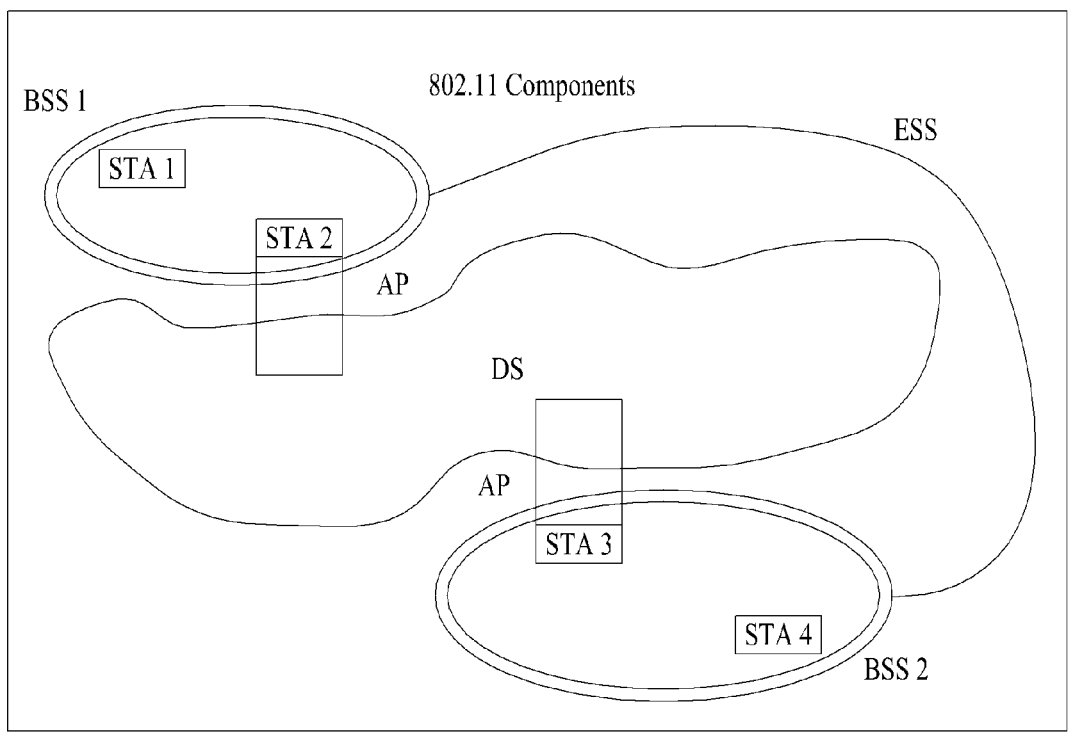
FIG. 3 illustrates another exemplary configuration of an IEEE 802.11 system to which the present invention is applicable.

FIG. 3 illustrates another exemplary configuration of the IEEE 802.11 system to which the present invention is applicable. In addition to the architecture illustrated in FIG. 2, FIG. 3 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 3. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 4:
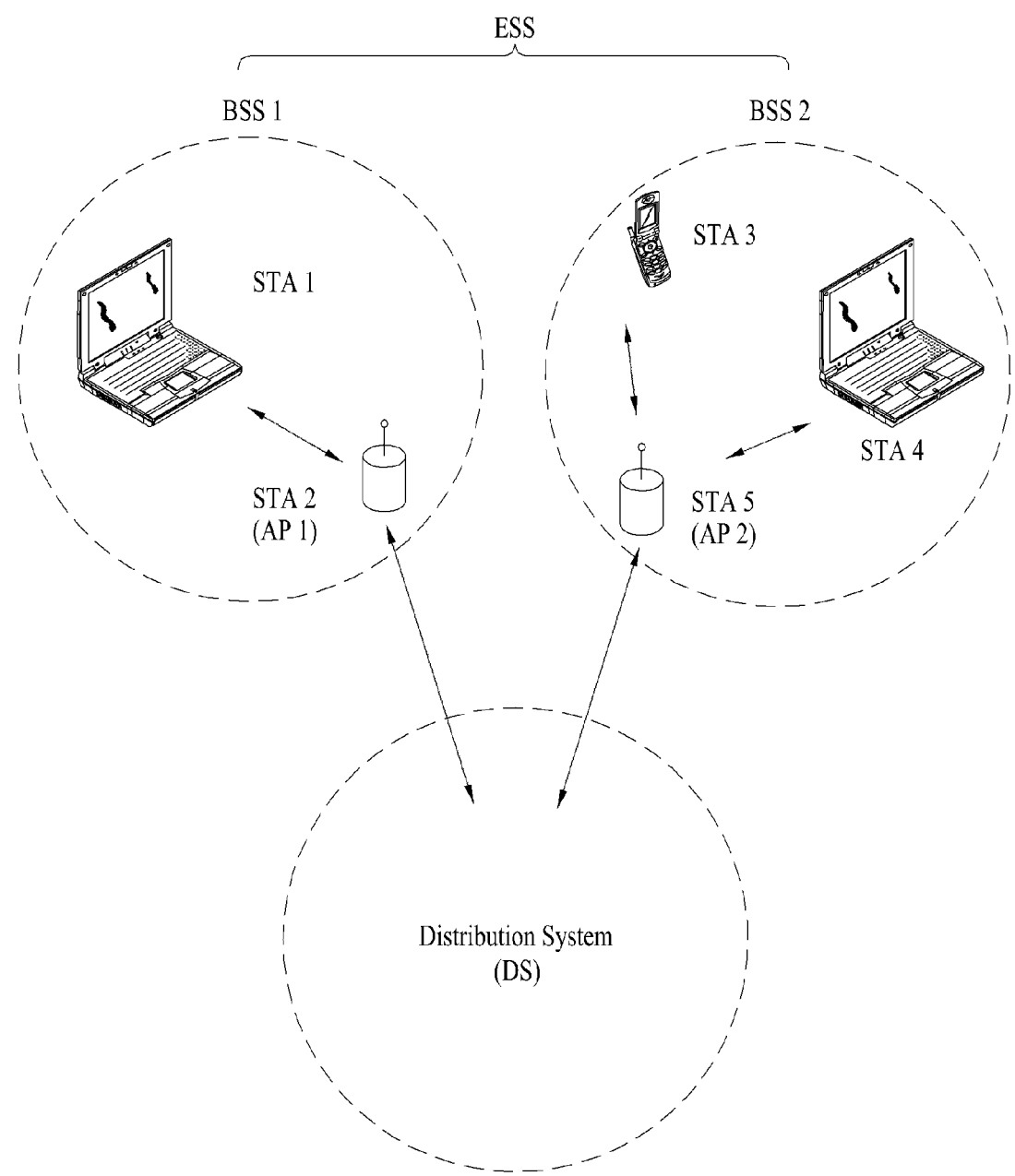
FIG. 4 illustrates an exemplary configuration of a Wireless Local Area Network (WLAN) system.

FIG. 4 illustrates an exemplary configuration of a WLAN system. In FIG. 4, an exemplary infrastructure BSS including a DS is illustrated.

In the example of FIG. 4, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 4, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Link Setup Procedure

Figure 5:
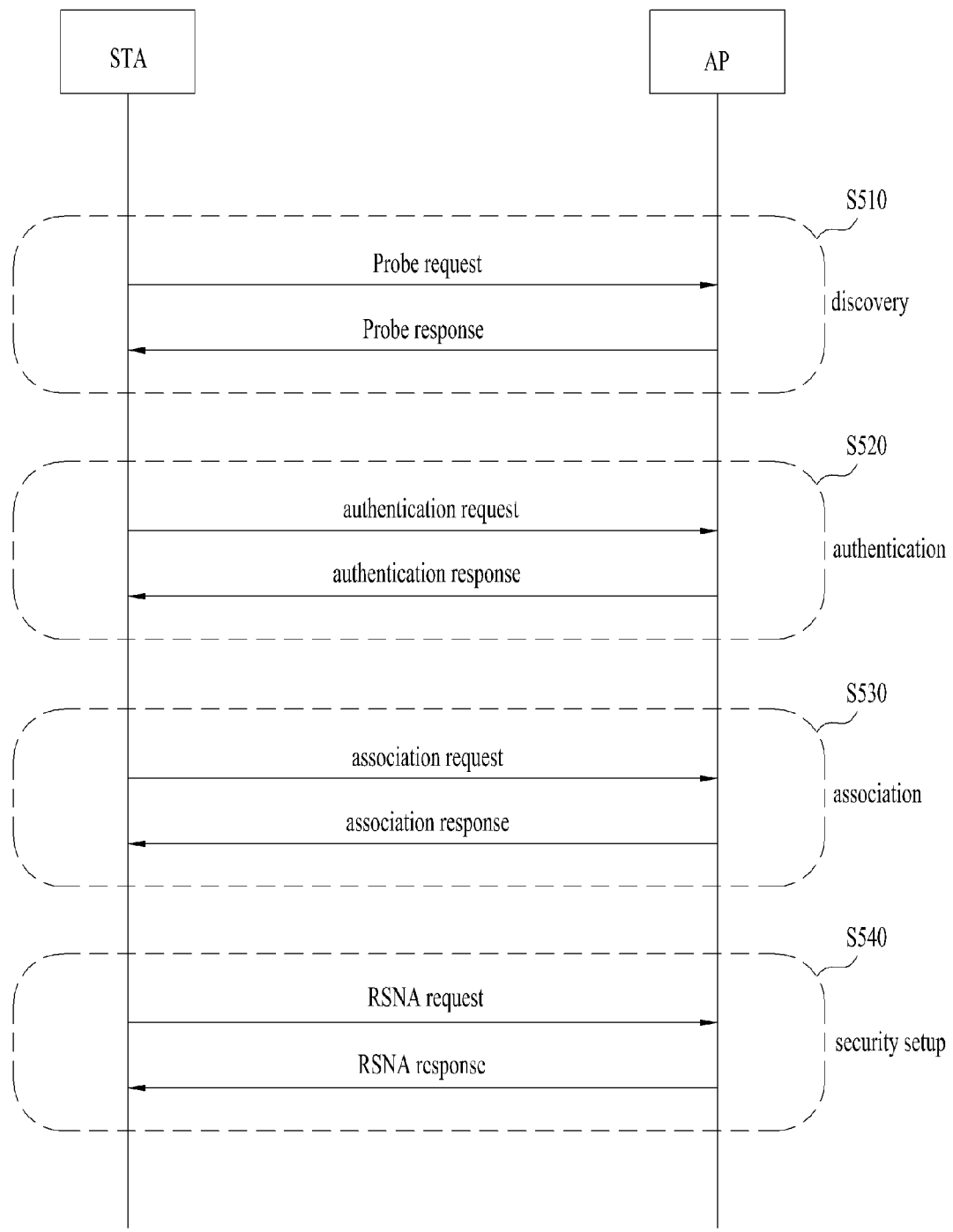
FIG. 5 illustrates a link setup procedure in a WLAN system.

FIG. 5 is a view referred to for describing a general link setup procedure.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 5.

In step S510, an STA may discover a network. The network discovery may include the STA's scanning. That is, the STA should search for a joinable network to access the network. The STA needs to identify a compatible network before joining a wireless network. Identification of a network present in a specific area is referred to as scanning.

Scanning is categorized into active scanning and passive scanning.

FIG. 5 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

While not shown in FIG. 5, the scanning may be passive scanning. An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame.

The authentication frame may include information about an authentication algorithm number, an authentication transaction sequence number, a state code, challenge text, a Robust Security Network (RSN), a Finite Cyclic Group (FCG), etc. The above-mentioned information contained in the authentication frame is an exemplary part of information that may be included in the authentication request/response frame. The information may be replaced with other information or include additional information.

The STA may transmit the authentication request frame to the AP. The AP may determine whether to accept authentication of the STA based on the information included in the received authentication request frame. The AP may provide an authentication processing result to the STA in the authentication response frame.

After the STA is successfully authenticated, an association procedure may be performed in step S530. The association procedure includes transmission of an association request frame to the AP by the STA and transmission of an association response frame to the STA by the AP in response to the association request frame.

For example, the association request frame may include information related to various capabilities, a beacon listening interval, a Service Set Identifier (SSID), supported rates, supported channels, an RSN, a mobility domain, supported operating classes, a Traffic Indication Map (TIM) broadcast request, interworking service capability information, etc.

For example, the association response frame may include information associated with various capabilities, a status code, an Association Identification (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information is an exemplary part of information that may be included in the association request/response frame. The information may be replaced with other information or may include additional information.

After the STA is successfully associated with the network, a security setup procedure may be performed in step S540. The security setup process of step S540 may be referred to as an authentication procedure based on a Robust Security Network Association (RSNA) request/response. The authentication procedure of step S520 may be referred to as a first authentication procedure and the security setup procedure of step S540 may be referred to simply as an authentication procedure.

The security setup procedure of step S540 may include private key setup through 4-way handshaking, for example, by an Extensible Authentication Protocol over LAN (EAPOL) frame. In addition, the security setup procedure may be performed according to any other security scheme that is not defined in the IEEE 802.11 standard.

Evolution of WLAN

To overcome the limitations of WLAN in communication speed, IEEE 802.11n has recently been established as a communication standard. IEEE 802.11n seeks to increase network speed and reliability and extend wireless network coverage. More specifically, IEEE 802.11n supports a High Throughput (HT) of up to 540 Mbps or higher. To minimize transmission errors and optimize data rates, IEEE 802.11n is based on Multiple Input Multiple Output (MIMO) using a plurality of antennas at each of a transmitter and a receiver.

Along with the increased use of WLAN and the development of diverse WLAN-based applications, there is a pressing need for a new WLAN system that supports a higher throughput than a throughput supported by IEEE 802.11n. A next-generation WLAN system supporting a Very High Throughput (VHT) is the next version to IEEE 802.11n WLAN (e.g. IEEE 802.11ac). It is one of systems that have been recently proposed to support a data processing rate of 1 Gbps or higher in a MAC Service Access Point (SAP).

The next-generation WLAN system supports a Multi-User (MU)-MIMO transmission scheme in which a plurality of STAs simultaneously access a channel in order to efficiently utilize radio channels. In the MU-MIMO transmission scheme, an AP may transmit a packet to at least one MIMO-paired STA simultaneously.

In addition, support of a WLAN system operation in White Space (WS) is under discussion. For example, the introduction of a WLAN system in TV WS such as an idle frequency band (e.g. a 54 to 698 MHz band) due to transitioning from analog TV to digital TV has been discussed under the IEEE 802.11af standard. However, this is purely exemplary and the WS may be a licensed band that a licensed user may use with priority. The licensed user is a user who has authority to use the licensed band. The licensed user may also be referred to as a licensed device, a primary user, an incumbent user, etc.

For example, an AP and/or an STA operating in WS should protect a licensed user. For example, if a licensed user such as a microphone has already been using a specific WS channel, that is, a frequency band regulated to be divided by a specific bandwidth in the WS band, the AP and/or the STA are not allowed to use the frequency band of the WS channel in order to protect the licensed user. If the licensed user is to use a frequency band that the AP and/or STA is using for frame transmission and/or reception, the AP and/or the STA should discontinue using the frequency band.

Therefore, the AP and/or the STA needs to determine whether the specific frequency band of the WS band is available, that is, whether a licensed user occupies the frequency band. Determination as to whether a licensed user is present in a specific frequency band is referred to as spectrum sensing. Energy detection scheme, signature detection, etc. are used as a spectrum sensing mechanism. If the strength of a received signal is equal to or larger than a predetermined value or a DTV preamble is detected, the AP and/or the STA may determine that a licensed user is using the frequency band.

Machine-to-machine (M2M) communication is under discussion as a next-generation communication technology. A technical standard of supporting M2M communication has been developed as IEEE 802.11ah in the IEEE 802.11 WLAN system. M2M communication is a communication scheme involving one or more machines. M2M communication may also be called Machine Type Communication (MTC) or machine-to-machine communication. A machine is an entity that does not require direct manipulation or intervention of a user. For example, not only a meter or vending machine equipped with a wireless communication module but also a User Equipment (UE) such as a smartphone capable of automatically accessing a network and communicating with the network without user manipulation/intervention may be machines. M2M communication may include Device-to-Device (D2D) communication, communication between a device and an application server, etc. Examples of communication between a device and an application server include communication between a vending machine and a server, communication between a Point Of Sale (POS) device and a server, and communication between an electric meter, a gas meter, or a water meter and a server. M2M communication-based applications may also include security, transportation, healthcare, etc. Considering the foregoing application examples, M2M communication should support occasional transmission/reception of a small amount of data at low rate under an environment with a huger number of devices.

More specifically, M2M communication should support a large number of STAs. Although a currently defined WLAN system is based on the premise that up to 2007 STAs are associated with one AP, methods for supporting association of more (about 6000) STAs with a single AP have been discussed in M2M communication. It is expected that many applications will support/require low rates in M2M communication. To fulfill these requirements, an STA may recognize the presence or absence of data to receive based on a TIM element in the WLAN system. In this regard, methods for reducing the bitmap size of the TIM have been discussed. It is also expected that much traffic will have a very long transmission/reception interval in M2M communication. For example, a very small amount of data needs to be transmitted and received at long intervals (e.g. every month), as is the case with electric/gas/water metering. Accordingly, although more and more STAs can be associated with a single AP in the WLAN system, methods for efficiently supporting a case in which a very small number of STAs are supposed to receive data frames from the AP during one beacon interval have been discussed.

As described above, the WLAN technology is rapidly evolving. Aside from the above-described examples, other techniques for performing direct link setup, improving media streaming throughput, supporting high-speed and/or large-scale initial session setup, and supporting extended bandwidth and operating frequency are being developed.

Medium Access Mechanism

In a WLAN system complying with IEEE 802.11, a basic access mechanism of the MAC layer is Carrier Sense Multiple Access with Collision Avoidance (CSMA/CA). The CSMA/CA mechanism is also referred to as Distributed Coordination Function (DCF) of the IEEE 802.11 MAC layer, which basically adopts a "listen before talk" access mechanism. In this type of access mechanism, an AP and/or an STA may sense a wireless channel or a medium during a predetermined time period (e.g. DCF Inter-Frame Space (DIFS)) by Clear Channel Assessment (CCA) before starting transmission. If the AP and/or the STA determines that the medium is idle as a result of the sensing, the AP and/or the STA starts frame transmission using the medium. On the other hand, if the AP and/or the STA determines that the medium is occupied, the AP and/or the STA does not start its transmission. Instead, the AP and/or the STA may attempt to perform frame transmission after setting a delay time (e.g. a random backoff period) for medium access and waiting for the delay time. As it is expected that multiple STAs attempt to perform frame transmission after waiting for different time periods by applying random backoff periods, collision may be minimized.

An IEEE 802.11 MAC protocol provides a Hybrid Coordination Function (HCF) which is based on a DCF and a Point Coordination Function (PCF). The PCF is a polling-based synchronous access scheme in which periodic polling is performed periodically to allow all receiving APs and/or STAs to receive a data frame. The HCF includes Enhanced Distributed Channel Access (EDCA) and HCF Controlled Channel Access (HCCA). EDCA is a contention-based access scheme used for a provider to provide a data frame to a plurality of users, and HCCA is a contention-free channel access scheme based on polling. The HCF includes a medium access mechanism for improving QoS of a WLAN. In the HCF, QoS data may be transmitted during both a Contention Period (CP) and a Contention-Free period (CFP).

Figure 6:
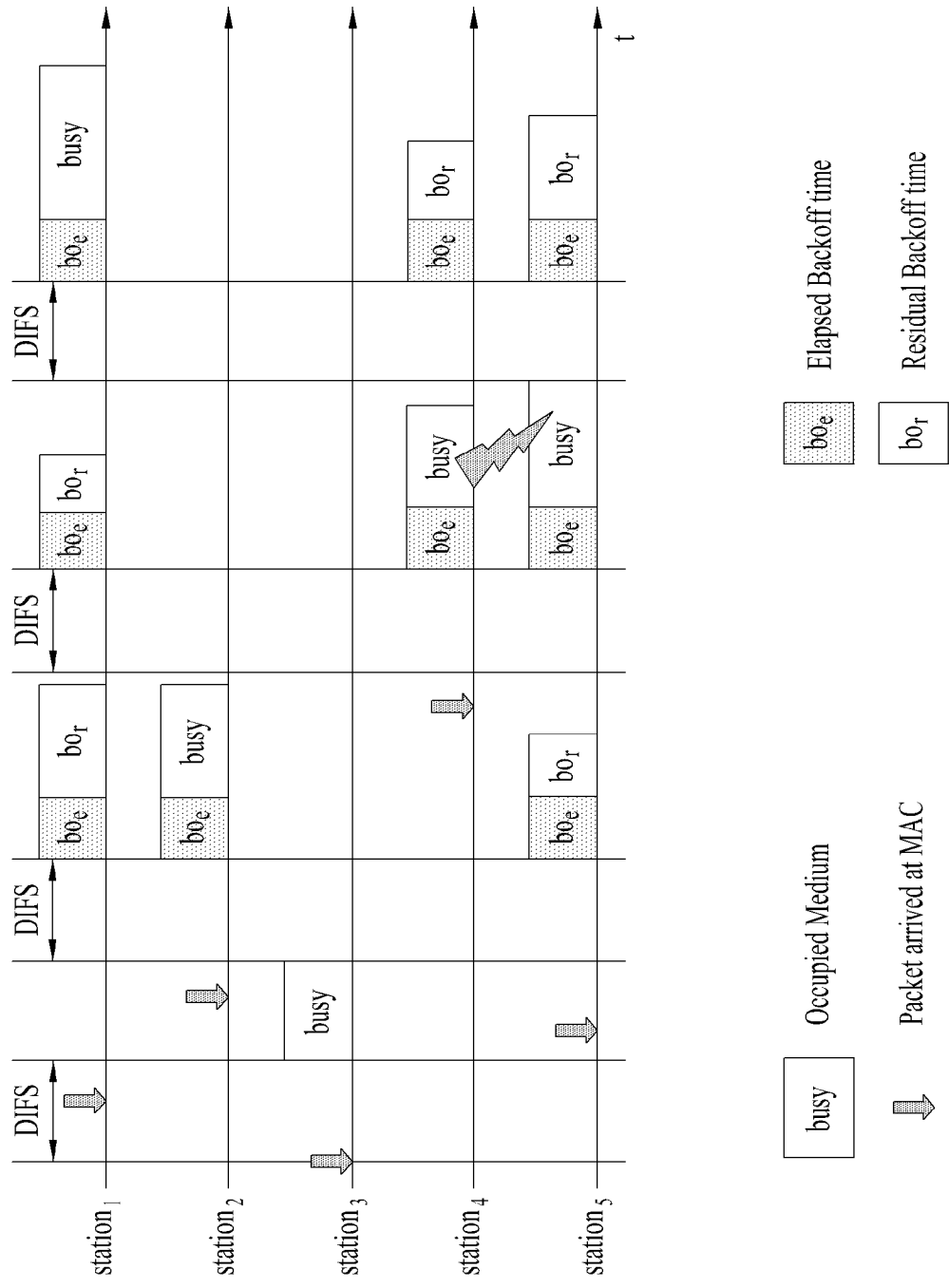
FIG. 6 illustrates a backoff procedure.

FIG. 6 is a view referred to for describing a backoff procedure.

An operation based on a random backoff period will be described with reference to FIG. 6. If a medium transitions from an occupied or busy state to an idle state, a plurality of STAs may attempt to transmit data (or frames). To minimize collision, each STA may select a random backoff count, wait for as long a slot time period as the selected backoff count, and then attempt transmission. The random backoff count may be a pseudo-random integer and selected from a range of 0 to CW. CW is a contention window parameter. Although CWmin is initially set to CWmin, it may be doubled upon transmission failure (e.g. in the case where an ACK for a transmitted frame is not received). If CW reaches CWmax, the STAs may attempt data transmission using CWmax until the data transmission is successful. If the data transmission is successful, CW is reset to CWmin. Preferably, CW, CWmin, and CWmax may be set to $2^n-1$ (where n=0, 1, 2, . . . ).

When the random backoff procedure starts, the STA continuously monitors the medium while counting down backoff slots according to the determined backoff count. If the medium is monitored as occupied, the STA discontinues the count-down and waits. When the medium becomes idle, the STA resumes the count-down of the remaining backoff slots.

In the illustrated case of FIG. 6, if a transmission packet arrives at the MAC layer of STA3, STA3 may immediately transmit a frame, confirming that the medium is idle. In the meantime, the remaining STAs monitor the medium as busy and wait. While the remaining STAs wait, transmission data may be generated in each of STA1, STA2, and STA5. If each of STA1, STA2, and STA5 monitors the medium as idle, the STA may wait for a DIFS and then count down backoff slots according to its selected random backoff count. In FIG. 6, STA2 selects a smallest backoff count and STA1 selects a largest backoff count That is, at the moment STA2 finishes backoff counting and then starts to transmit a frame, the residual backoff time of STA5 is shorter than that of STA1. While STA is occupying the medium, STA1 and STA5 temporarily discontinue count-down and wait. If STA2 does not occupy the medium any longer and thus the medium becomes idle, STA1 and STA5 wait for a DIFS and resume the backoff counting. That is, after counting down as many remaining backoff slots as the remaining residual backoff time, each of STA1 and STA5 may start frame transmission. Since the residual backoff time of STA5 is shorter than that of STA1, STA5 starts frame transmission. While STA2 is occupying the medium, transmission data may also be generated in STA4. If the medium becomes idle, STA4 may wait for the DIFS, count down backoff slots according to its selected random backoff count, and then start frame transmission. In FIG. 6, the residual backoff time of STA5 happens to be equal to that of STA4. In this case, collision may occur between STA4 and STA5. When collision occurs, either STA4 or STA5 does not receive an ACK, resulting in data transmission failure. Then, STA4 and STA5 may double CW values, select random backoff counts, and then count down backoff slots. While the medium is occupied for transmission of STA and STA5, STA1 may wait. Then if the medium becomes idle, STA1 may wait for the DIFS and start frame transmission after its residual backoff time.

Sensing Operation of STA

As described before, the CSMA/CA mechanism includes virtual carrier sensing as well as physical carrier sensing in which an AP and/or an STA directly senses a medium. Virtual carrier sensing is performed to overcome problems that may be encountered with medium access, such as a hidden node problem. For virtual carrier sensing, the MAC layer of the WLAN system may use a Network Allocation Vector (NAV). An AP and/or an STA, which is currently using the medium or has authority to use the medium, indicates a time left until the medium is available to anther AP and/or another STA by a NAV. Accordingly, the NAV indicates a time period scheduled for the AP and/or the STA transmitting the frame to use the medium. Upon receipt of the NAV, an STA is not allowed to access the medium during the time period. The NAV may be set, for example, according to a value set in a "duration" field of a MAC header of a frame.

A robust collision detection mechanism has been introduced to reduce the probability of collision. This robust collision detection mechanism will be described with reference to FIGS. 7 and 8. While a carrier sensing range may be different from a transmission range in real implementation, it is assumed that the carrier sensing range and the transmission range are the same, for the convenience of description.

Figure 7:
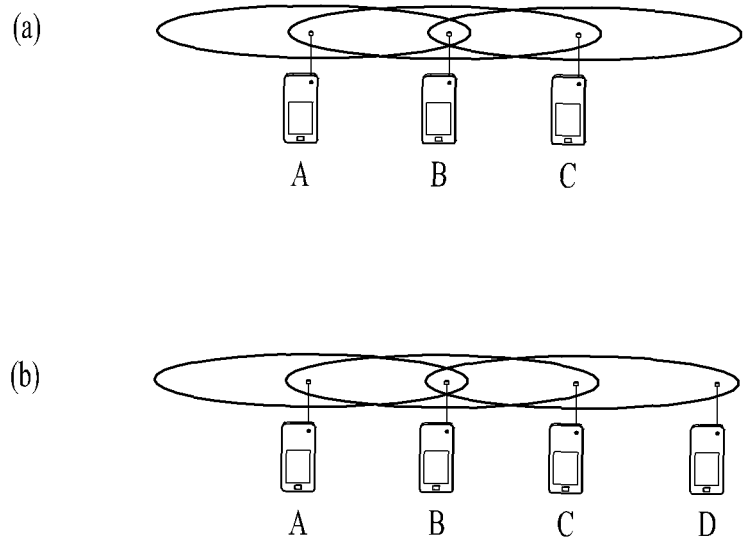
FIG. 7 illustrates a hidden node and an exposed node.

FIG. 7 is a view referred to for describing hidden nodes and exposed nodes.

FIG. 7(a) illustrates an exemplary hidden node. In FIG. 7(a), STA A is communicating with STA B, and STA C has information to be transmitted. Specifically, STA C may determine that a medium is idle during carrier sensing before transmitting data to STA B, although STA A is transmitting information to STA B. This may occur because transmission of STA A (i.e. occupation of the medium) may not be detected at the location of STA C. As a result, STA B receives information from STA A and STA C simultaneously and thus collision occurs. Herein, STA A may be a hidden node to STA C.

FIG. 7(b) illustrates an exemplary exposed node. In FIG. 7(b), while STA B is transmitting data to STA A, STA C has information to be transmitted to STA D. If STA C performs carrier sensing, STA C may determine that a medium is occupied due to transmission of STA B. Therefore, although STA C has information to be transmitted to STA D, STA C should wait until the medium is idle since the medium is sensed as occupied. However, since STA A is actually located out of the transmission range of STA C, transmission from STA C may not collide with transmission from STA B from the viewpoint of STA A. Thus, STA C unnecessarily waits until STA B discontinues transmission. Herein, STA C may be an exposed node to STA B.

Figure 8:
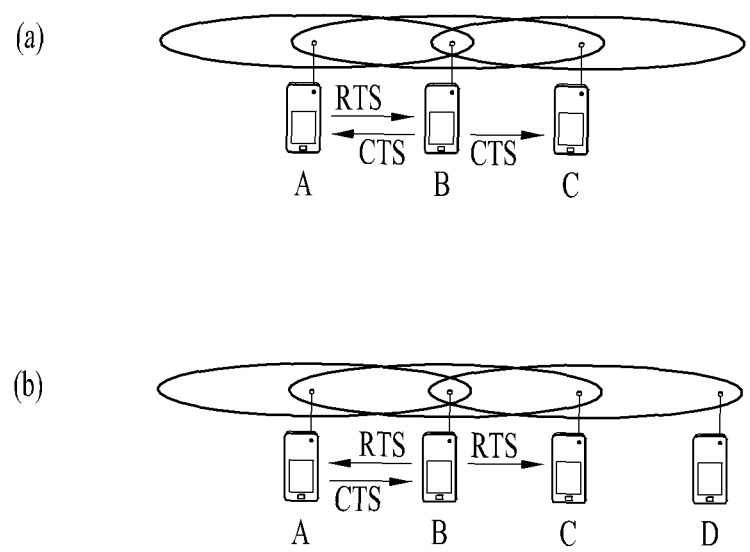
FIG. 8 is a view referred to for describing Request To Send (RTS) and Clear To Send (CTS)

FIG. 8 is a view referred to for describing Request To Send (RTS) and Clear To Send (CTS).

To efficiently utilize a collision avoidance mechanism in the exemplary situation of FIG. 7, short signaling packets such as RTS and CTS may be used. RTS/CTS between two STAs may be overheard by neighboring STA(s), so that the neighboring STA(s) may determine whether information is transmitted between the two STAs. For example, if a transmitting STA transmits an RTS frame to a receiving STA, the receiving STA may indicate to its neighboring STAs that it will receive data by transmitting a CTS frame to the peripheral STAs.

FIG. 8(a) illustrates an exemplary method for solving the hidden node problem. In FIG. 8(a), it is assumed that both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

FIG. 8(b) illustrates an exemplary method for solving an exposed node problem. STA C may overhear RTS/CTS transmission between STA A and STA B and thus may determine that no collision will occur although STA C transmits data to another STA (e.g. STA D). That is, STA B transmits an RTS frame to all neighboring STAs and only STA A having actual transmission data may transmit a CTS frame. Because STA C receives only the RTS frame without receiving the CTS frame from STA A, it may determine that STA A is located outside the carrier sensing range of STA C.

Frame Structure

Figure 9:
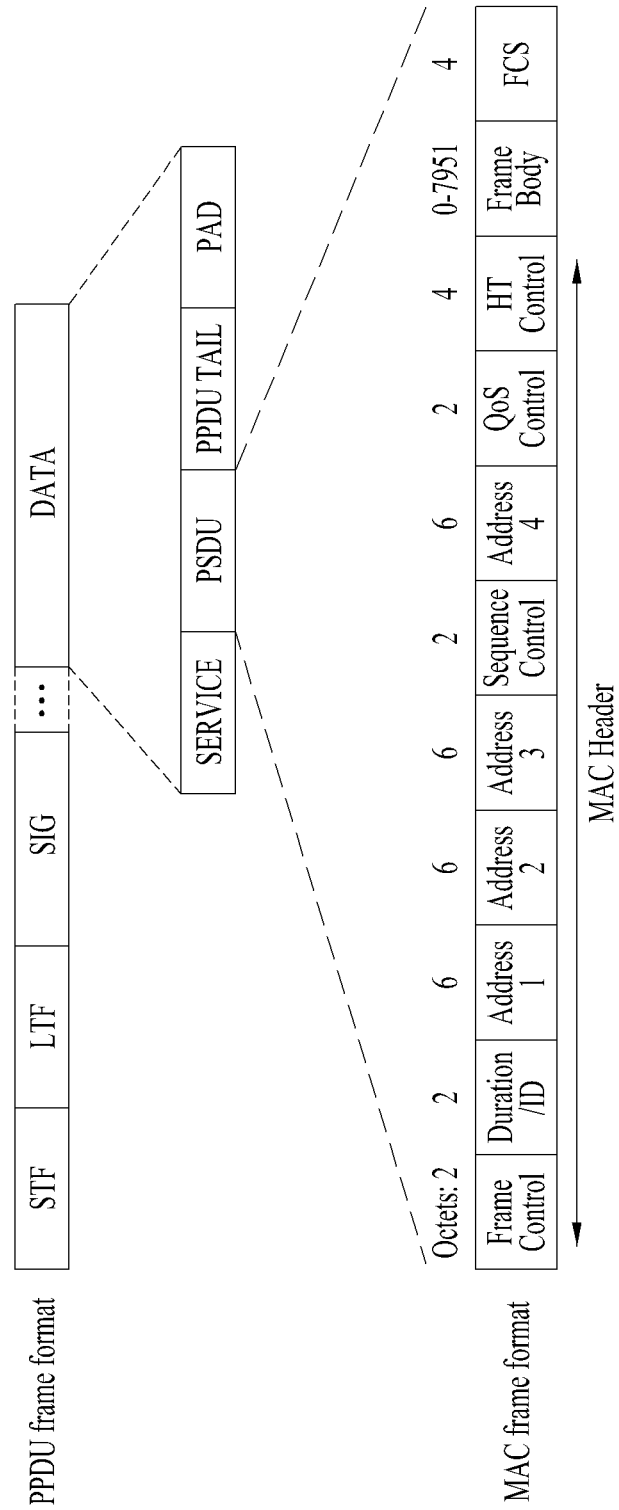
FIG. 9 illustrates an exemplary frame structure in an IEEE 802.11 system.

FIG. 9 is a view referred to for describing an exemplary frame structure in an IEEE 802.11 system.

A PLCP (Physical Layer Convergence Protocol) Packet Data Unit (PPDU) may be formatted to include Short Training Field (STF), Long Training Field (LTF), SIGnal (SIG), and Data. A basic PPDU frame (e.g., a non-High Throughput (HT) PPDU frame) may be formatted to include only Legacy-STF (L-STF), Legacy LTF (L-LTF), SIG, and Data. Additional (or different types of) STF, LTF, and SIG may be included between the SIG and Data fields according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF is used for channel estimation, frequency error estimation, etc. The STF and the LTF may be collectively called a PLCP preamble. The PLCP preamble is used for synchronization and channel estimation of an OFDM physical layer.

The SIG field may include a RATE field and a LENGTH field. The RATE field may include information about a modulation and coding scheme of data. The LENGTH field may include information about the length of the data. The SIG field may further include parity bits, SIG TAIL bits, etc.

The Data field may include SERVICE field, a PLCP Service Data Unit (PSDU), and PPDU TAIL bits. When needed, the Data field may further include padding bits. A part of bits of the SERVICE field may be used for synchronization of a descrambler at a receiver. The PSDU corresponds to a MAC PDU defined by a MAC layer and may include data generated/used by a higher layer. The PPDU TAIL bits may be used to return an encoder to a zero state. The padding bits may be used to match the length of the Data field in units of a predetermined unit.

A MAC PDU is defined according to various MAC frame formats. A basic MAC frame includes a MAC header, a frame body, and a Frame Check Sequence (FCS) field. The MAC frame may include a MAC PDU and may be transmitted/received in the PSDU of the Data field in the PPDU frame format.

The MAC header includes a Frame Control field, a Duration/ID field, Address fields, etc. The Frame Control field may include control information required for frame transmission/reception. The Duration/ID field may be set to a time period in which a corresponding frame is transmitted. Four Address fields, Address 1, Address 2, Address 3 and Address 4 may indicate a Basic Service Set Identifier (BSSID), a Source Address (SA), a Destination Address (DA), a Transmitter Address (TA), and a Receiver Address (RA), respectively. Only a part of the four Address fields may be included according to a frame type.

For example, Address 1 may be set to the address (i.e. the RA) of a receiver to receive the MAC frame and Address 2 may be set to the address (i.e. the TA) of a transmitter that transmits the MAC frame.

If three Address fields are used, Address 1 may be set to the RA and Address 2 may be set to the TA. Address 3 may be set to the BSSID, the SA of the MAC frame on a DL (i.e., From DS), or the DA of the MAC frame on a UL (i.e., To DS).

If all of the four Address fields are used, Address 1 may be set to the RA, Address 2 may be set to the TA, Address 3 may be set to the DA, and Address 4 may be set to the SA.

Each of these Address fields, Address 1, Address 2, Address 3, and Address 4 may be set to indicate a 48-bit Ethernet MAC address.

A Null Data Packet (NDP) frame format means a frame format that does not include a data packet. That is, an NDP frame includes only the PLCP header (i.e., STF, LTF, and SIG) of the general PPDU format, without the remaining part of the PPDU format (i.e., the Data field). The NDP frame may be referred to as a short frame.

Power Management

As described before, an STA should perform channel sensing before transmission and reception in a WLAN system. Continuous channel sensing causes continuous power consumption of the STA. Considering that power consumption in a reception state is almost the same as power consumption in a transmission state, maintaining the reception state imposes a great load on a power-limited STA (i.e. an STA operated by a battery). Therefore, if the STA is kept in a reception standby state to continuously sense a channel, the STA inefficiently consumes power, without any special advantage in terms of WLAN throughput. In avert this problem, the WLAN system supports a Power Management (PW) mode for an STA.

The PM mode of the STA is classified into an active mode and a Power Save (PS) mode. The STA basically operates in the active mode. The STA operating in the active mode is kept awake. In the awake state, the STA may perform normal operations including frame transmission and reception, channel scanning, etc. On the other hand, the STA switches between a sleep state (or a doze state) and an awake state in the PS mode. In the sleep state, the STA operates with minimum power, without performing frame transmission and reception and channel scanning.

As the STA operates longer in the sleep state, the STA consumes less power, thus lengthening an operation time. However, the STA may not stay in the sleep state unconditionally because it is impossible to transmit or receive a frame in the sleep state. In the presence of a frame to be transmitted to an AP, a sleep-state STA may switch to the awake state and then transmit the frame in the awake state. If the AP has a frame to be transmitted to the STA, the sleep-state STA is unable to receive the frame and does not know the presence of a frame to be received. Accordingly, the STA may need to switch to the awake state in every specific period to determine the presence or absence of a frame to receive (or to receive a frame in the presence of the frame to receive).

Figure 10:
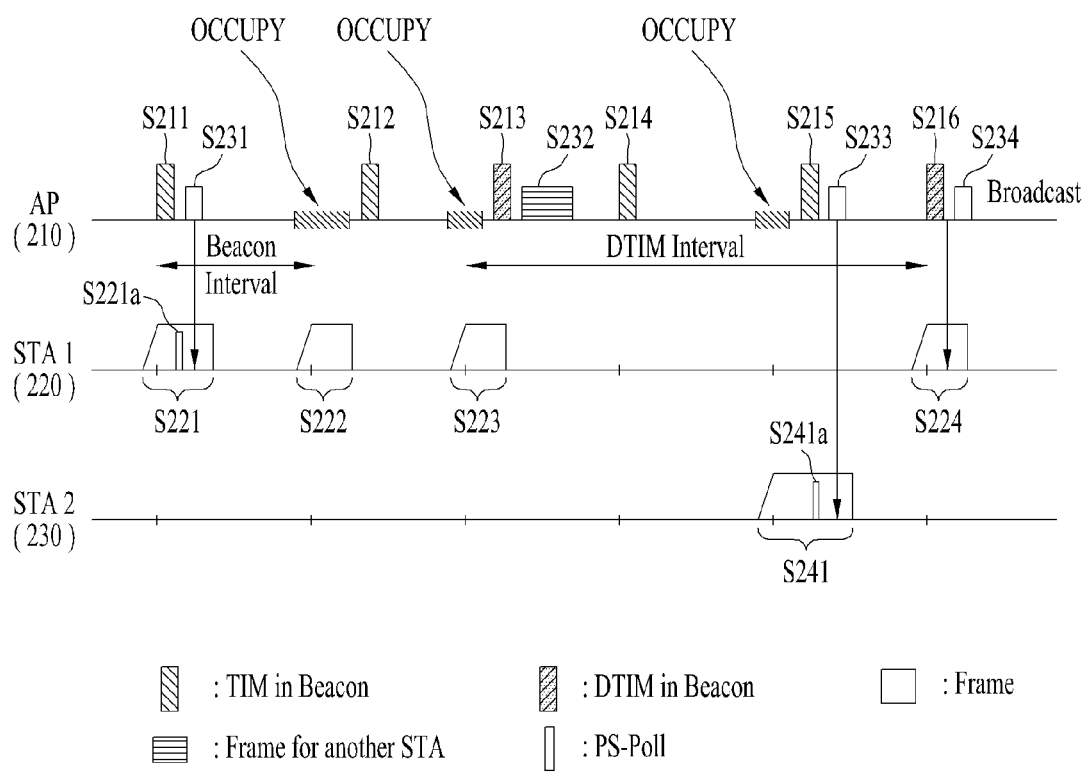
FIG. 10 illustrates a power management operation.

FIG. 10 is a view referred to for describing a power management operation.

Referring to FIG. 10, an AP 210 transmits a beacon frame to STAs within a BSS at every predetermined interval (S211, S212, S213, S214, S215, and S216). The beacon frame includes a TIM information element. The TIM information element includes information indicating that the AP 210 has buffered traffic for STAs associated with the AP 210 and will transmit frames to the STAs. The TIM information element includes a TIM indicating a unicast frame and a Delivery Traffic Indication Map (DTIM) indicating a multicast or broadcast frame.

The AP 210 may transmit a DTIM once every three beacon frame transmissions. Each of STA1 220 and STA2 230 operate in the PS mode. STA1 220 and STA2 230 may be configured to switch from the sleep state to the awake state at every wakeup interval of a predetermined period and to receive the TIM information element from the AP 210. Each STA may calculate a switching time at which it will switch to the awake state based on its own local clock. In FIG. 10, it is assumed that the STAs have the same clock as the AP.

For example, the predetermined wakeup interval may be set in such a manner that STA1 220 may switch to the awake state in each beacon interval to receive the TIM element. Accordingly, when the AP 210 first transmits the beacon frame (S211), STA1 220 may switch to the awake state (S221). STA1 220 may receive the beacon frame and acquire the TIM information element from the beacon frame. If the TIM information element indicates the presence of a frame to be transmitted to STA1 220, STA1 220 may transmit to the AP 210a a Power Save-Poll (PS-Poll) frame requesting transmission of the frame (S221a). The AP 210 may transmit the frame to STA1 220 in response to the PS-Poll frame (S231). Upon complete receipt of the frame, STA1 220 returns to the sleep state.

When the AP 210 transmits the beacon frame at a second time, another device accesses the medium and thus the medium is busy. Therefore, the AP 210 may not transmit the beacon frame at the accurate beacon interval. Instead, the AP 210 may transmit the beacon frame at a delayed time (S212). In this case, although STA1 220 switches to the awake state at the beacon interval, STA1 fails to receive the delayed beacon frame and thus returns to the sleep state (S222).

When the AP 210 transmits the beacon frame at a third time, the beacon frame may include a TIM information element configured as a DTIM. However, since the medium is busy, the AP 210 transmits the beacon frame at a delayed time (S213). STA1 220 may switch to the awake state at the beacon interval and acquire the DTIM from the beacon frame received from the AP 210. It is assumed that the DTIM indicates the absence of a frame to be transmitted to STA1 220 and the presence of a frame to be transmitted to another STA. Then, STA1 220 may return to the sleep state, determining that there is no frame to be received. After transmitting the beacon frame, the AP 210 transmits the frame to the corresponding STA (S232).

The AP 210 transmits the beacon frame at a fourth time (S214). However, since STA1 220 has not acquired information indicating the presence of traffic buffered for STA1 220 from the previous twice-received TIM information element, STA1 220 may adjust the wakeup interval to receive the TIM information element. Or if a beacon frame transmitted by the AP 210 includes signaling information for adjusting the wakeup interval of STA1 220, the wakeup interval of the STA1 220 may be adjusted. In this example, STA1 220 may be configured to change its operation state from one wake-up in every beacon interval to one wake-up in every 3 beacon intervals, in order to receive a TIM information element. Therefore, when the AP 210 transmits a fourth beacon frame (S214) and transmits a fifth beacon frame (S215), STA1 220 is kept in the sleep state and thus may not acquire a corresponding TIM information element.

When the AP 210 transmits the beacon frame at a sixth time (S216), STA1 220 may switch to the awake state and acquire a TIM information element from the beacon frame (S224). The TIM information element is a DTIM indicating the presence of a broadcast frame. Accordingly, STA1 220 may receive the broadcast frame from the AP 210 without transmitting a PS-Poll frame to the AP 210 (S234). In the meantime, a wakeup interval configured for STA2 230 may be set to be longer than the wakeup interval of STA1 220. Thus, when the AP 210 transmits the beacon frame at the fifth time (S215), STA2 230 may enter the awake state and receive the TIM information element (S241). STA2 230 may determine the presence of a frame to receive by the TIM information element and transmit a PS-Poll frame to the AP 210 to request frame transmission (S241a). The AP 210 may transmit the frame to STA2 230 in response to the PS-Poll frame (S233).

To implement the PS mode as illustrated in FIG. 10, a TIM element includes either a TIM indicating the presence or absence of a frame to be transmitted to an STA or a DTIM indicating the presence or absence of a broadcast/multicast frame. The DTIM may be configured by setting a field in the TIM element.

Figure 11:
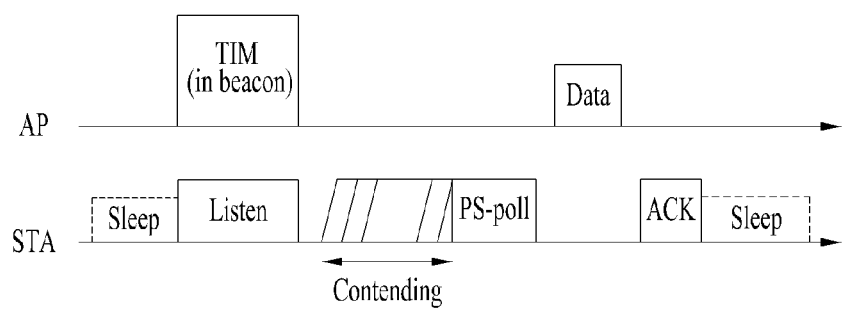
FIGS. 11, 12, and 13 illustrate an operation of a Station (STA) that has received a Traffic Indication Map (TIM) in detail.
Figure 12:
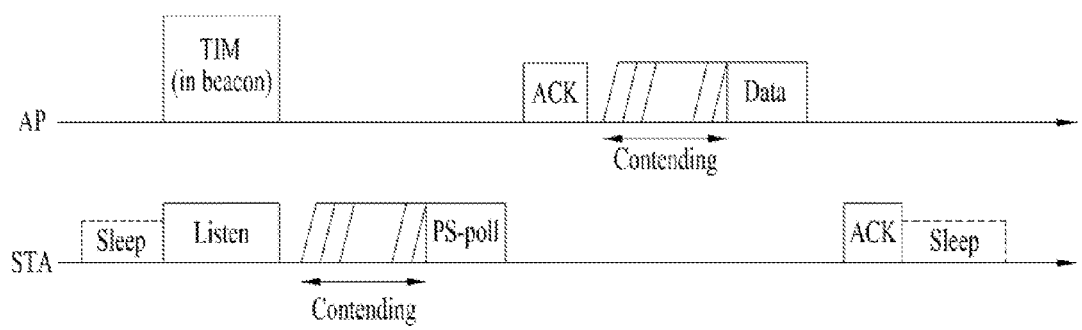
Figure 13:
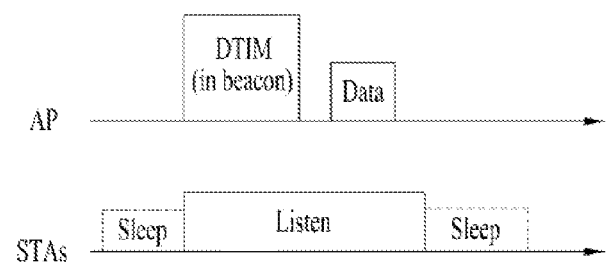

FIGS. 11, 12, and 13 are views referred to for describing an operation of an STA that has received a TIM in detail.

Referring to FIG. 11, an STA switches from a sleep state to an awake state to receive a beacon frame including a TIM element from an AP. The STA may determine the presence of buffered traffic directed to the STA by interpreting the received TIM element. After contending with other STAs to access a medium for transmission of a PS-Poll frame, the STA may transmit a PS-Poll frame requesting data frame transmission to the AP. Upon receipt of the PS-Poll frame from the STA, the AP may transmit the frame to the STA. The STA may receive a data frame and then transmit an ACKnowledgment (ACK) frame to the AP in response to the received data frame. Subsequently, the STA may return to the sleep state.

As illustrated in FIG. 11, the AP may receive the PS-Poll frame from the STA and transmits the data frame after a predetermined time (e.g. a Short InterFrame Space (SIFS)) according to an immediate response scheme. If the AP does not prepare a data frame to be transmitted to the STA during the SIFS after receiving the PS-Poll frame, the AP may operate according to a deferred response scheme, which will be described with reference to FIG. 12.

As in the example of FIG. 12, an STA switches from a sleep state to an awake state, receives a TIM from an AP, and transmits a PS-Poll frame to the AP through contention in the illustrated case of FIG. 11. If the AP does not prepare a data frame during an SIFS after receiving the PS-Poll frame, the AP may transmit an ACK frame to the STA, instead of the data frame. If the AP prepares the data frame after transmitting the ACK frame, the AP may transmit the data frame to the STA after contention. The STA may transmit, to the AP, an ACK frame indicating that the data frame has been received successfully and may switch to the sleep state.

FIG. 13 illustrates an exemplary case in which an AP transmits a DTIM. STAs may switch from the sleep state to the awake state to receive a beacon frame including a DTIM element from the AP. The STAs may determine from the received DTIM that a multicast/broadcast frame will be transmitted to them. After transmitting the beacon frame including the DTIM, the AP may directly transmit data (i.e. the multicast/broadcast frame) without receiving a PS-Poll frame. The STAs receives the data in the awake state in which they are kept after receiving the beacon frame including the DTIM. Upon complete receipt of the data, the STAs may return to the sleep state.

TIM Structure

In the PS-mode operation method based on the TIM (or DTIM) protocol described above with reference to FIGS. 10 to 13, an STA may determine whether there is a data frame to be transmitted to the STA by STA identification information included in a TIM element. The STA identification information may be information related to an AID which is allocated to an STA when the STA is associated with an AP.

An AID is used as a unique ID of each STA within one BSS. For example, the AID may be one of 1 to 2007 in the current WLAN system. In the currently defined WLAN system, 14 bits may be allocated to an AID in a frame transmitted by an AP and/or an STA. Although the AID value may be assigned up to 16383, the values of 2008 to 16383 are reserved.

An already defined TIM element is not suitable for M2M applications by which many STAs (for example, more than 2007 STAs) may be associated with one AP. If the conventional TIM structure is extended without any change, a TIM bitmap gets too large in size. As a consequence, the extended TIM structure may not be supported with a legacy frame format and is inappropriate for M2M communication for which low-rate applications are considered. In addition, it is expected that a very small number of STAs are supposed to receive a data frame during one beacon interval. Therefore, considering the afore-mentioned M2M communication application examples, it is expected that the size of a TIM bitmap will be increased but most bits of the TIM bitmap are set to zeros (0s) in many cases. In this context, there is a need for a method for efficiently compressing a bitmap.

Conventionally, successive zeroes at the start of a bitmap are omitted and represented by an offset (or a starting point) in order to compress the bitmap. However, if there are buffered frames for a small number of STAs but the differences between the AID values of the STAs are large, compression efficiency is not high. For example, if there are buffered frames for only two STAs having AIDs of 10 and 2000, respectively, the resulting compressed bitmap is of length 1990, with all zeros except for non-zeroes at both ends. If a small number of STAs can be associated with one AP, inefficiency of bitmap compression does not matter much. On the contrary, if the number of STAs associable with one AP increases, such inefficiency may degrade overall system performance.

Figure 14:
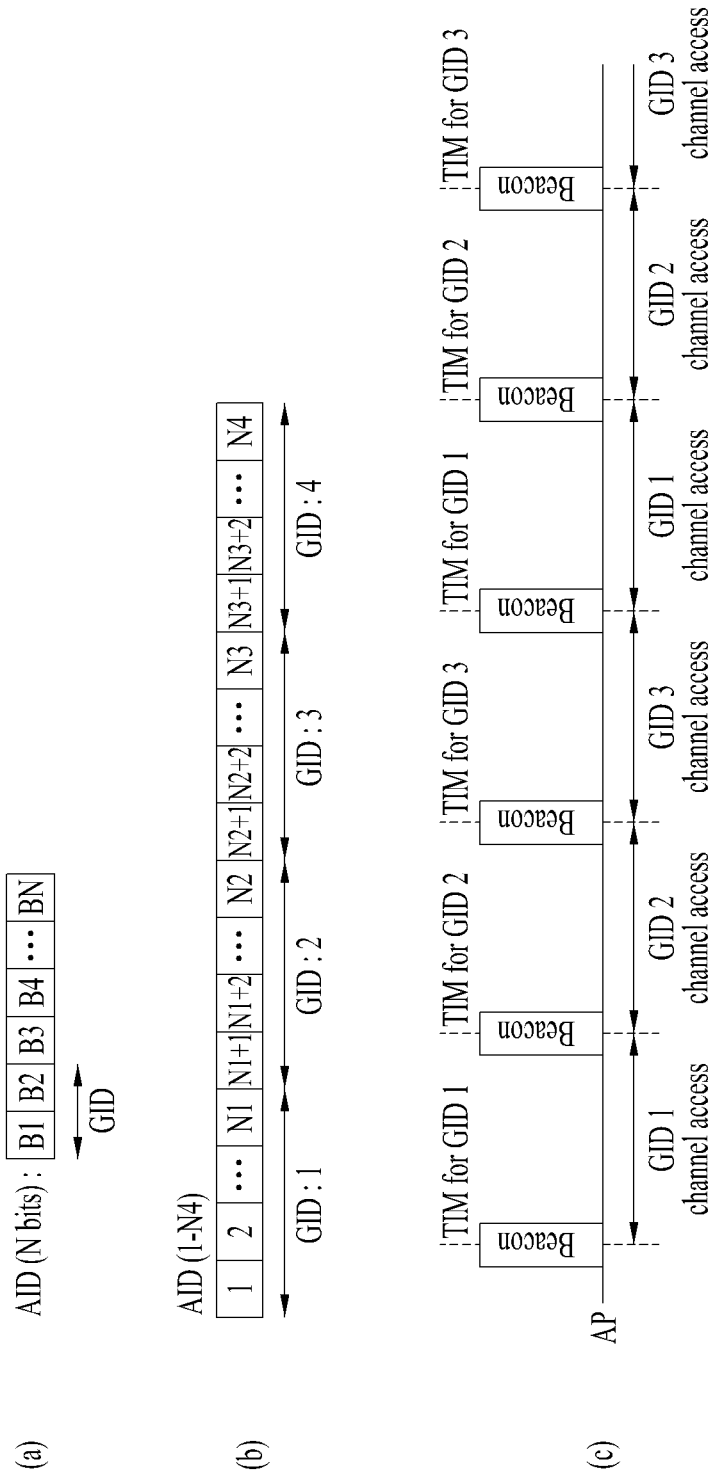
FIG. 14 illustrates group-based Association Identifiers (AIDs)

To overcome the problem, AIDs may be divided into a plurality of groups, for more effective data transmission. A predetermined Group ID (GID) is allocated to each group. Allocation of AIDs on a group basis will be described below with reference to FIG. 14.

FIG. 14(a) illustrates an example of AIDs allocated on a group basis. In FIG. 14(a), a few first bits of an AID bitmap may be used to indicate a GID. For example, 4 GIDs may be represented in the first 2 bits of the AID bitmap. If the AID bitmap includes N bits in total, the first 2 bits (B1 and B2) may represent the GID of the AIDs.

FIG. 14(b) illustrates another example of AIDs allocated on a group basis. In FIG. 14(b), GIDs may be allocated according to the positions of the AIDs. In this case, AIDs having the same GID may be represented by an offset and a length. For example, if GID 1 is represented by offset A and length B, this means that AIDs ranging from A to A+B−1 in a bitmap have GID 1. For example, it is assumed in FIG. 14(b) that AIDs ranging from 1 to N4 are divided into four groups. In this case, AIDs belonging to GID 1 are 1 to N1 and thus may be represented by offset 1 and length N1. AIDs belonging to GID 2 may be represented by offset N1+1 and length N2−N1+1, AIDs belonging to GID 3 may be represented by offset N2+1 and length N3−N2+1, and AIDs belonging to GID 4 may be represented by offset N3+1 and length N4−N3+1.

As this group-based AID allocation enables channel access during different time periods according to GIDs, lack of TIM elements for a large number of STAs may be overcome and data may be transmitted and received efficiently, as well. For example, channel access is available only to an STA(s) of a specific group, while channel access may be restricted for the other STA(s), during a specific time period. The specific time period during which channel access is available only to the STA(s) of the specific group may be called a Restricted Access Window (RAW).

With reference to FIG. 14(c), GID-based channel access will be described below. FIG. 14(c) illustrates an exemplary channel access mechanism based on beacon intervals, when AIDs are divided into three groups. A first beacon interval (or a first RAW) is a time period during which channel access is allowed for STAs having the AIDs of GID 1 and denied for the STAs belonging to the other GIDs. To implement this mechanism, a TIM element only for the AIDs of GID 1 is included in a first beacon. A TIM element only for the AIDs of GID 2 is included in a second beacon frame. Accordingly, channel access is allowed only for STAs having the AIDs of GID 2 during a second beacon interval (or a second RAW). A TIM element only for the AIDs of GID 3 is included in a third beacon frame, so that channel access may be allowed only for STAs having the AIDs of GID 3 during a third beacon interval (or a third RAW). A TIM element only for the AIDs of GID 1 is included in a fourth beacon frame, so that channel access may be allowed only for the STAs having the AIDs of GID 1 during a fourth beacon interval (or a fourth RAW). In the same manner, channel access may be allowed only for the STAs of a specific group indicated by a TIM included in a corresponding beacon frame during each of beacon intervals following the fifth beacon interval (or during each of RAWs following the fifth RAW).

While the order of allowed GIDs is cyclic or periodic according to the beacon intervals in FIG. 14(c), this should not be construed as limiting the present invention. That is, as only an AID(s) having a specific GID(s) may be included in a TIM element, channel access may be allowed only for an STA(s) having the specific AID(s) and denied for the remaining STA(s), during a specific time interval (e.g. a specific RAW).

The above group-based AID allocation scheme may be referred to as a hierarchical TIM structure. That is, a total AID space is divided into a plurality of blocks and channel access is allowed only for an STA(s) (i.e. an STA(s) of a specific group) corresponding to a specific block(s) having non-zero values. Therefore, since a large-sized TIM is divided into small-sized blocks/groups, an STA may easily maintain TIM information and the blocks/groups may be easily managed according to the class, QoS, or usage of the STA. Although FIG. 14 exemplarily illustrates a 2-level layer, a hierarchical TIM with two or more levels may be configured. For example, a total AID space may be divided into a plurality of page groups, each page group may be divided into a plurality of blocks, and each block may be divided into a plurality of sub-blocks. Then, the example of FIG. 14(a) may be extended in such a manner that first N1 bits of an AID bitmap represent a Page ID (i.e. PID), the next N2 bits represent a block ID, the next N3 bits represent a sub-block ID, and the remaining bits represent an STA bit position in a sub-block.

In the following examples of the present invention, STAs (or AIDs allocated to the respective STAs) may be divided into predetermined hierarchical groups and managed in various manners. However, the group-based AID allocation scheme is not limited to the specific examples.

Methods for Encoding Partial Virtual Bitmap

Figure 15:
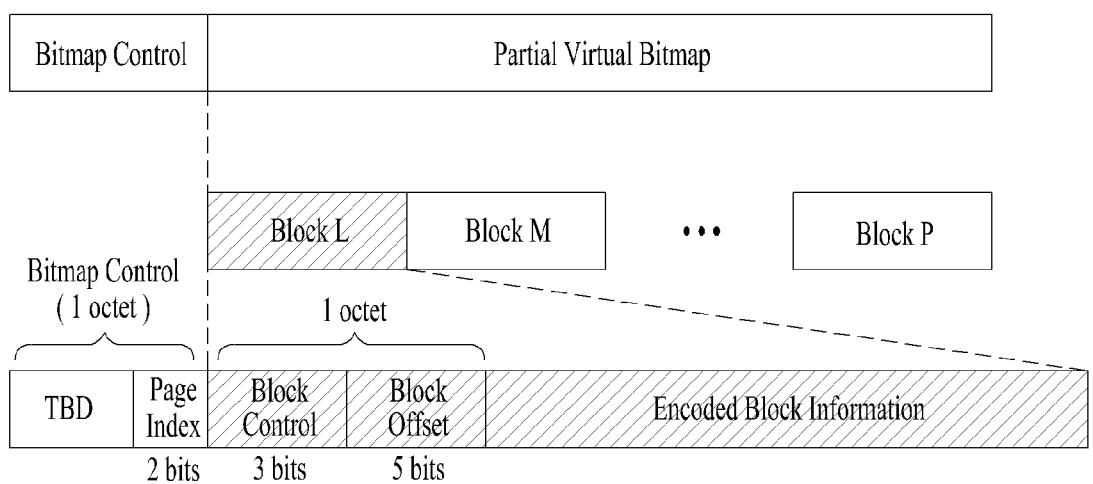
FIG. 15 illustrates a method for indicating a TIM bitmap in a partial virtual bitmap scheme.

FIG. 15 is a view referred to for describing a method for indicating a TIM bitmap in a partial virtual bitmap scheme.

A TIM may include a Bitmap Control field and a partial virtual bitmap. The Bitmap Control field may include a 2-bit page index and the remaining 6 bits of the Bitmap Control field may be allocated, for example, to a 1-bit group-addressed traffic indicator and a 5-bit TIM segment number.

The partial virtual bitmap is encoded at a block level. The partial virtual bitmap includes one or more encoded blocks at one paging.

One block may include a Block Control field (3 bits), a Block Offset field (5 bits), and encoded block information.

The Block Offset field is set to a value indicating the position of the block in the whole TIM bitmap.

The encoded block information may be configured as illustrated in FIG. 16, which will be described later in detail.

The Block Control field includes information describing how a block bitmap and a sub-block bitmap are used. 2 bits of the Block Control field may indicate a mode selected from among various encoding modes such as a block bitmap mode, a single AID mode, an Offset+Length+Bitmap (OLB) mode, an AID Differential Encode (ADE) mode, etc. The remaining 1 bit of the Block Control field may indicate whether an inverse bitmap mode is used. That is, the remaining 1 bit of the Block Control field indicates whether an inverse bitmap is applied in each of the block bitmap mode, the single AID mode, the OLB mode, and the ADE mode. In the inverse bitmap mode, if the block bitmap includes many ones, the block bitmap is inversed (by changing zeroes to ones and ones to zeroes) in order to reduce overhead.

If the Block Control field indicates the block bitmap mode, the encoded block information includes a block bitmap sub-field and M sub-block sub-fields, as illustrated in FIG. 16(a).

The block bitmap is 1 octet long. An $n^{th}$ bit position of the block bitmap indicates whether an $n^{th}$ sub-block bitmap exists in the block (the $n^{th}$ bit is one in the presence of the $n^{th}$ sub-block and zero in the absence of the $n^{th}$ sub-block). The number of ones in the block bitmap means that there are as many sub-block bitmaps as the number of ones.

A sub-block bitmap is one octet long and at least one bit of the sub-block bitmap is set to one. An $n^{th}$ bit position of the sub-block bitmap indicates whether data for an $m^{th}$ STA is buffered in an AP. Accordingly, the sub-block bitmap may indicate the presence of data for an STA corresponding to AID=[Page Index (2 bits), Block Offset (5 bits), n (3 bits), m (3 bits)].

Figure 17:
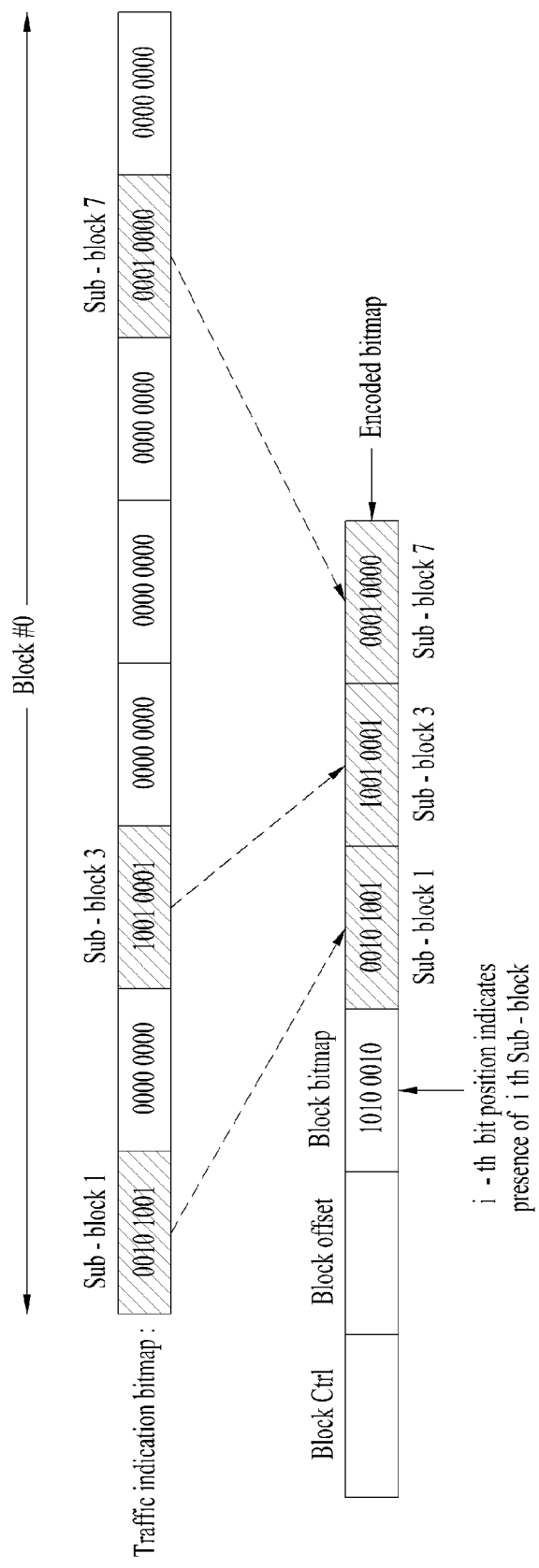
FIG. 17 illustrates block encoding in a block bitmap mode.

FIG. 17 is a view referred to for describing block encoding in the block bitmap mode.

Referring to FIG. 17, block #0 of a TIM (prior to encoding) includes 8 sub-blocks. Bits set to zeroes in block #0 indicate that data for STAs (7 STAs in the example of FIG. 17) having AIDs corresponding to the bits are buffered in an AP. Block #0 may be encoded to a partial virtual bitmap in the block bitmap mode, as illustrated in the lower drawing of FIG. 17.

Specifically, a plurality of AIDs may be indicated by one sub-block. In the example of FIG. 17, one sub-block may indicate 8 AIDs in total. A sub-block to which at least one paged AID belongs among 8 sub-blocks of a block is included in the partial virtual bitmap and a sub-block without any paged AID (i.e., a sub-block with all of 8 bits set to zeroes) is not included in the partial virtual bitmap. In the example of FIG. 17, sub-block 1, sub-block 3, and sub-block 7 include paged AIDs, and the remaining sub-blocks do not include any AID. Accordingly, as first, third, and seventh bits out of eight bits of a Block Bitmap field are set to ones, the following sub-block bitmaps may indicate first, third, and seventh bitmaps of the block. The sub-block bitmaps are identical to their counterparts in the original TIM. Therefore, a decoder of the partial virtual bitmap may determine a block related to the block bitmap from a Block Offset field, determine the position(s) of a sub-block(s) following the Block Bitmap field in the block from the block bitmap, and determine the original bitmap by filling zeroes at the positions of non-existent sub-blocks.

If the Block Control field indicates a single AID mode, the encoded block information part is configured as illustrated in FIG. 16(b). That is, in the case where there is a single AID in a block, 6 bits of the encoded block information are used to represent 6 Least Significant Bits (LSBs) and the remaining 2 bits of the encoded block information are reserved. In this case, there is no sub-block field.

If the Block Control field indicates the OLB mode, the encoded block information is configured as illustrated in FIG. 16(c). If the Length field is set to n, this means that n successive sub-block fields follow the Length field sequentially.

Figure 18:
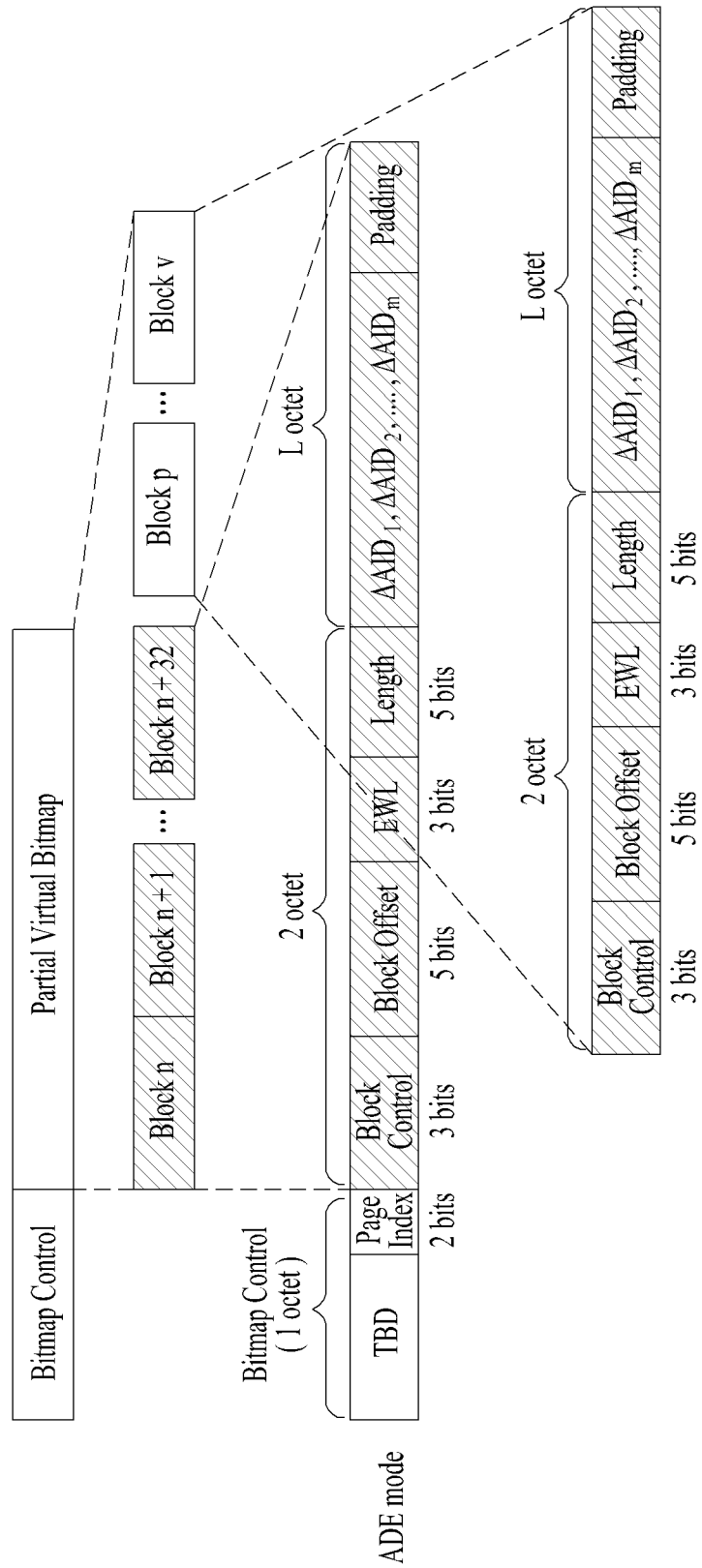
FIG. 18 illustrates a conventional method for configuring a partial virtual bitmap in an AID Differential Encode (ADE) mode.

FIG. 18 is a view referred to for describing a conventional method for configuring a partial virtual bitmap in the ADE mode.

If the Block Control field indicates the ADE mode, the partial virtual bitmap may be configured as illustrated in FIG. 18. In the example of FIG. 18, the encoded block information illustrated in FIG. 15 is shown as including a 3-bit Encoded Word Length (EWL) field, a 5-bit Length field, consecutive bits of AID differential values ($\Delta AID$), $\Delta AID_1$, $\Delta AID_2$, . . . , $\Delta AID_m$, and padding bits.

In the ADE mode, each block may include up to 256 consecutive encoded AIDs. The EWL field indicates the number of bits required for encoding a maximum AID differential value, $\max(\Delta AID_i)$ (i=1, 2, . . . , m). The Length field specifies the length of the encoded bitmap in octets.

The ADE mode refers to a mode in which if m AIDs of m paged STAs are arranged in an ascending order, that is, $AID_1, AID_2, \ldots, AID_m$, the AIDs are encoded/compressed using the differential values between the AIDs. Herein, it may be defined that $\Delta AID_1 = AID_1$ and $\Delta AID_i = AID_i - AID_{i-1}$ (i=2, 3, . . . , m). The ADE-mode encoding may be performed by concatenating the binary forms of $\Delta AID_1$, $\Delta AID_2$, . . . , $\Delta AID_m$.

The padding bits are used to match the encoded block information in octets (i.e., to a length expressed as a plurality of octets). If the length of $\Delta AID_1, \Delta AID_2, \ldots, \Delta AID_m$, is less than a multiple of an octet, padding bits may be added to match the length of $\Delta AID_1$, $\Delta AID_2$, . . . , $\Delta AID_m$, to the multiple of an octet.

Advanced ADE Mode

In the conventional ADE mode, an STA, which has received a TIM bitmap, does not know the total number of paged STAs. As a result, the STA may not determine an end point indicating the last paged STA in an encoded information part. That is, since the receiving STA cannot determine the last of $\Delta AID$ fields, it may not decode the TIM bitmap successfully. This problem is encountered with the ADE mode in which the size of $\Delta AID$ is variable.

Figure 19:
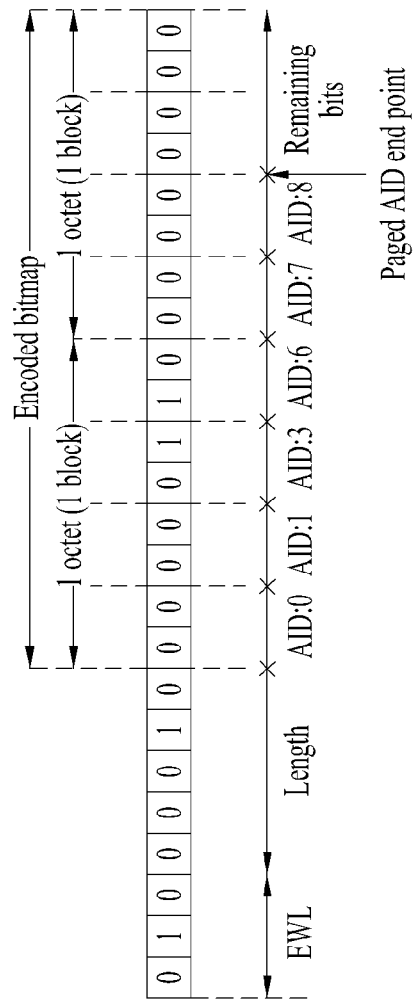
FIG. 19 is a view referred to for describing a problem encountered with the conventional method for configuring a partial virtual bitmap in an ADE mode.

FIG. 19 is a view referred to for describing a problem encountered with a method for configuring a partial virtual bitmap in the conventional ADE mode.

In the example of FIG. 19, the Block Control field and the Block Offset field before the EWL and Length fields are omitted.

Upon receipt of a partial virtual bitmap illustrated in FIG. 19, an STA may determine from the EWL field set to 010 that max($\Delta AID$) is 2 and from the Length field set to 00010 that an encoded bitmap is 2 octets long. Therefore, the STA may be aware that $\Delta AID$ is 2 bits.

In addition, if a $\Delta AID$ field is 00, 01, 10, or 11, 00, 01, 10, and 11 are interpreted respectively as delta 1, delta 2, delta 3, and delta 4. For example, if the value of a $\Delta AID_i$ field is 00, $AID_i$ is different from by 1. If the value of the $\Delta AID_i$ field is 01, $AID_i$ is different from by 2. If the value of the $\Delta AID_i$ field is 10, $AID_i$ is different from by 3. If the value of the $\Delta AID_i$ field is 11, $AID_i$ is different from by 4.

The bit value of the first $\Delta AID$ field indicates the first AID value ($\Delta AID_1 = AID_1$) because there is no previous AID (i.e., $AID_{i-1}$). For example, if $\Delta AID_1 = 00$, $AID_1 = 00$ (i.e., AID #0). If $\Delta AID_1 = 01$, $AID_1 = 01$ (i.e., AID #1), if $\Delta AID_1 = 10$, $AID_1 = 10$ (i.e., AID #2), and if $\Delta AID_1 = 11$, $AID_1 = 11$ (i.e., AID #3).

In the example of FIG. 19, since the value of the first $\Delta AID$ field is 00, the STA may determine that the first paged AID is AID #0. Since the value of the second $\Delta AID$ field is 00, which indicates delta 1, the STA may determine that the second paged AID is AID #1 having a difference of 1 from AID #0. The value of the third $\Delta AID$ field is 01, which indicates delta 2 (i.e., a difference of 2). Thus, the STA may determine that the third paged AID is AID #3 having a difference of 2 from AID #1. Since the value of the fourth $\Delta AID$ field is 10, which indicates delta 3 (i.e., a difference of 3), the STA may determine that the fourth paged AID is AID #6 having a difference of 3 from AID #3. Likewise, the STA may determine from the fifth and sixth $\Delta AID$ fields that AID #7 and AID #8 are paged.

While the sixth $\Delta AID$ field is the end point of the paged AIDs and the remaining bits are padding bits on the part of an AP that generates the TIM partial virtual bitmap, the STA receiving the partial virtual bitmap may not determine whether the remaining bits following the sixth $\Delta AID$ field are an additional $\Delta AID$ field or padding bits. If the STA interprets actual padding bits as an additional $\Delta AID$ field, the STA may determine that AID #9 and AID #10 are paged and thus may perform an unnecessary operation or may malfunction.

The present invention provides a method for overcoming the problem of the above-described conventional ADE method. Specifically, an AP effectively indicates information required for acquiring an original TIM bitmap successfully to an STA that receives a TIM configured in a partial virtual bitmap scheme.

Embodiment 1

In an embodiment of the present invention, information about the total number of paged STAs indicated by a partial virtual bitmap is signaled to an STA. The receiving STA may accurately determine the end point of the AIDs of the paged STAs in an encoded information part based on the information about the total number of the paged STAs received from the AP. Therefore, a decoder of the STA may stop decoding at the AID end point.

Figure 20:
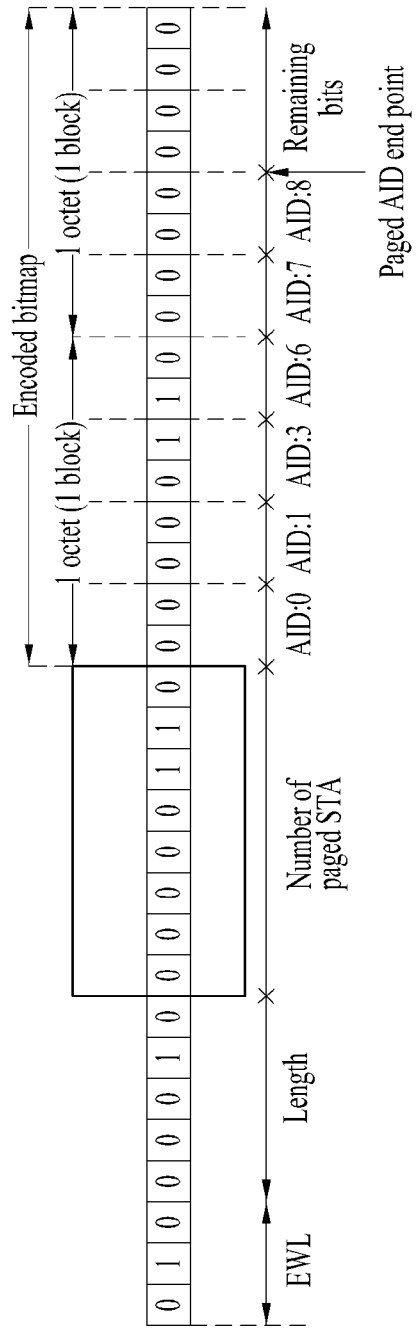
FIG. 20 illustrates a method for configuring a partial virtual bitmap in an ADE mode according to an embodiment of the present invention.

FIG. 20 is a view referred to for describing a method for configuring a partial virtual bitmap in an ADE mode according to an embodiment of the present invention.

When an AP configures a partial virtual bitmap, the AP may add information about the number of paged STAs to the partial virtual bitmap. For example, a Number of paged STA field may follow a Length field and may be 1 octet long.

In the example of FIG. 20, a total of 6 STAs having AID #0, AID #1, AID #3, AID #6, AID #7, and AID #8 are paged. Thus, the Number of paged STA field may be set to 00000110. Upon receipt of a partial virtual bitmap having this configuration, an STA may determine from an EWL field that the size of one $\Delta AID$ field is 2 bits and that there are 6 $\Delta AID$ fields because 6 STAs are paged. Accordingly, the STA may determine that 12 bits are used for the $\Delta AID$ fields and the remaining 4 bits are padding bits in the encoded bitmap of 2 octets. Consequently, the STA may successfully decode the 6 AIDs indicated by the partial virtual bitmap.

The Number of paged STA field may be configured in various manners according to the size and value of the EWL field. While the Number of paged STA field is 1 octet long in FIG. 20 by way of example, the size of the Number of paged STA field may be optimized.

For example, if the EWL field is set to 2, the size of one $\Delta AID$ field is 2 bits. Thus, the number of paged STAs that may be indicated by the last block of the encoded bitmap (i.e., a block corresponding to the second octet in the 2-octet encoded bitmap) is 1, 2, 3, or 4 in FIG. 20 (if the number of paged STAs is 0, the last block does not exist). If the Number of paged STA field is defined to indicate the number of paged STAs in the last block (the last octet), not the total number of paged STAs indicated by the encoded bitmap, the size of the Number of paged STA field may be minimized. In this case, the Number of paged STA field may be configured to be 2 bits long (i.e., the Number of paged STA field indicates only one of 1, 2, 3, and 4). For example, the Number of paged STA field may be 2 bits long and the remaining 6 bits may be reserved in the example of FIG. 20. Since a total of 6 STAs are paged and only 2 STAs are paged in the last block as illustrated in FIG. 20, the Number of paged STA field may be set to 00000010. If the Number of paged STA field is configured in this manner, the number of paged STAs may be fully represented using 2 bits no matter how large the total number of paged STAs is.

In addition, the position of the Number of paged STA field in a partial virtual bitmap may be a bit position other than shown in FIG. 20, not limited to the example of FIG. 20. The Number of paged STA information is not necessarily included in the partial virtual bitmap. Rather, the AP may signal the Number of paged STA information to the STA by other signaling.

Embodiment 2

This embodiment provides a method for transmitting information indicating a termination state in a partial virtual bitmap to an STA by an AP. The receiving STA may accurately determine an AID end point of paged STAs in an encoded information part based on the information about the termination state received from the AP.

Figure 21:
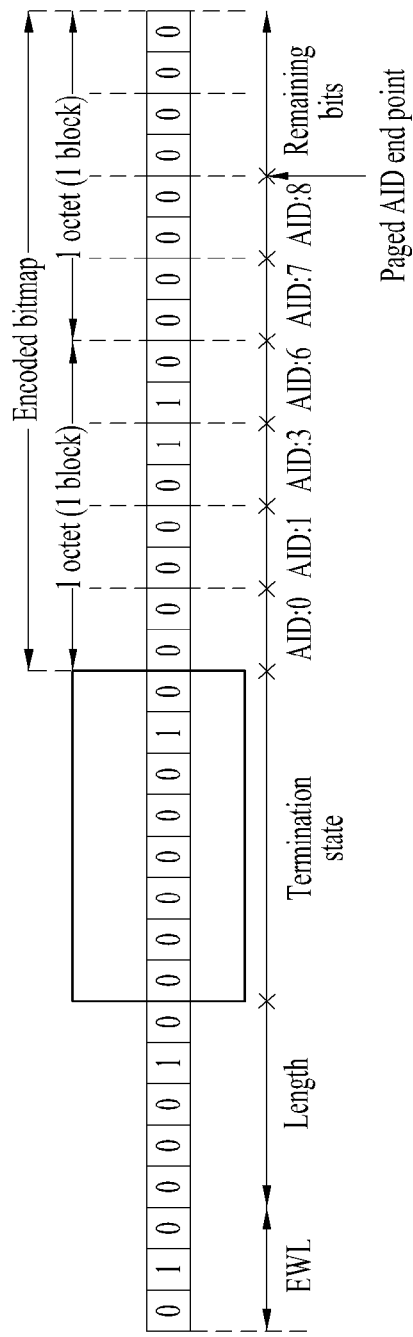
FIG. 21 illustrates a method for configuring a partial virtual bitmap in an ADE mode according to another embodiment of the present invention.

FIG. 21 is a view referred to for describing a method for configuring a partial virtual bitmap in the ADE mode according to another embodiment of the present invention.

When an AP configures a partial virtual bitmap, the AP may add information about a termination state to the partial virtual bitmap. For example, a Termination state field may follow a Length field and may be 1 octet long.

In the example of FIG. 21, the remaining bits except for ΔAID fields in the last block of an encoded bitmap (i.e. the last octet of the encoded bitmap) are 4 bits. Accordingly, the Termination state field may be set to 00000100 directly indicating the number of the remaining bits except for the ΔAID fields in the last block.

The configuration of the Termination state field may be optimized in consideration of the size and value of an EWL field. For example, the EWL field may indicate that the size of one ΔAID field is 2 bits in the example of FIG. 21. Accordingly, it may be determined that the encoded bitmap is configured in units of 2 bits and 2 bits may be one bit set unit. In this case, the remaining bits (i.e., 4 bits) except for the ΔAID fields in the last block may be 2 bit set units. Therefore, the Termination state field may be set to 00000010 to indicate the number of the remaining bits except for the ΔAID fields as the number of bit set units (i.e., to indicate 2 bit set units).

If the configuration of the Termination state field is optimized, the number of the remaining bits except for ΔAID fields may be expressed as the number of bit set units by one of states 0, 1, 2, and 3. Therefore, the size of the Termination state field may be optimized to 2 bits. For example, the Termination state field may be configured to be 2 bits and the remaining 6 bits may be reserved in the example of FIG. 21.

In addition, the position of the Termination state field in the partial virtual bitmap may be a bit position other than shown in FIG. 21, not limited to the example of FIG. 21. The Termination state information is not necessarily included in the partial virtual bitmap. Rather, the AP may signal the Termination state information to the STA by other signaling.

Embodiment 3

An STA may recognize a termination state even though a Termination state field is not explicitly included in a partial virtual bitmap. Accordingly, the STA may successfully interpret a partial virtual bitmap configured in the ADE mode, preventing an increase in the signaling overhead of the partial virtual bitmap configured in the ADE mode.

Figure 22:
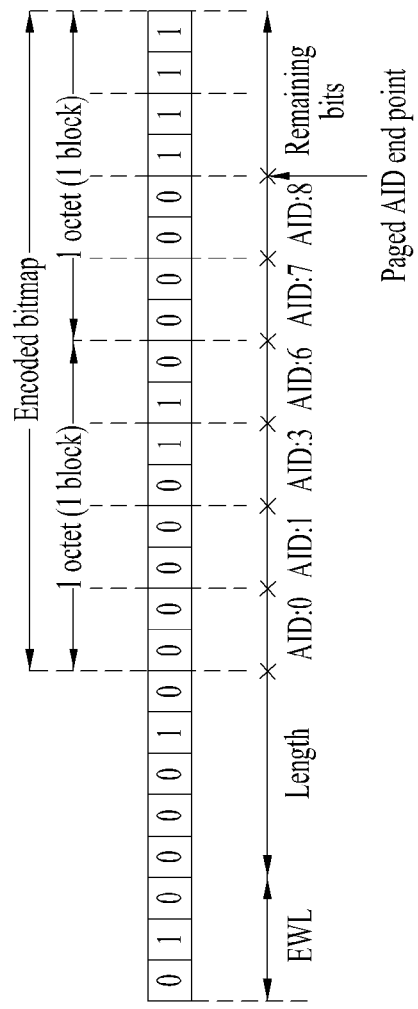
FIG. 22 illustrates a method for configuring a partial virtual bitmap in an ADE mode according to another embodiment of the present invention.

FIG. 22 is a view referred to for describing a method for configuring a partial virtual bitmap in the ADE mode according to another embodiment of the present invention.

For example, in the case where an EWL field is set to 2, if an ΔAID field has a value of 00, 01, 10, or 11, 00, 01, 10, and 11 are interpreted conventionally as delta 1, delta 2, delta 3, and delta 4, respectively. According to the present invention, one of the values 00, 01, 10, and 11 may be preset as indicating the termination state. For example, it may be predetermined that if the value of the ΔAID field is 11, this indicates the termination state. Therefore, it may be determined that the ΔAID field previous to the ΔAID field having 11 provides a delta value with which to determine the last AID. However, since there is no need for defining the termination state for the first ΔAID field (or the termination state cannot be defined for the first ΔAID field because of the absence of any ΔAID field previous to the first ΔAID field), the bit value of the first ΔAID field indicates the first AID ($\Delta AID_1 = AID_1$).

In this case, although the number of candidate states available to a ΔAID field is decreased (e.g., 11 cannot be used as indicating delta 4 for the ΔAID field in the above example), this method is advantageous in that the end point of paged AIDs is explicitly indicated to an STA without the need for defining an additional bit indicating the termination state.

In the example of FIG. 22, since the value of the first ΔAID field is 00, it indicates AID #0. For each of the second and subsequent ΔAID fields, if the ΔAID field is set to 00, it may indicate delta 1, if the ΔAID field is set to 01, it may indicate delta 2, if the ΔAID field is set to 10, it may indicate delta 3, and if the ΔAID field is set to 11, it may indicate the termination state. In FIG. 22, since the seventh ΔAID field is set to 11, it indicates that the sixth ΔAID field provides a delta value for the last AID.

The ΔAID field set to the value indicating the termination state (including following bits, if the following bits exist) corresponds to padding bits following $\Delta AID_1, \Delta AID_2, \ldots, \Delta AID_m$ indicating actual ΔAID values. In other words, a padding bit having a specific value may indicate the end of ΔAIDs.

The termination state may be indicated by a value other than 11. For example, for each of the remaining ΔAID fields except for the first ΔAID field, if the ΔAID field is set to 00, it may indicate the termination state, if the ΔAID field is set to 01, it may indicate delta 1, if the ΔAID field is set to 10, it may indicate delta 2, and if the ΔAID field is set to 11, it may indicate delta 3. In this case, the partial virtual bitmap may be configured as illustrated in FIG. 23.

Figure 23:
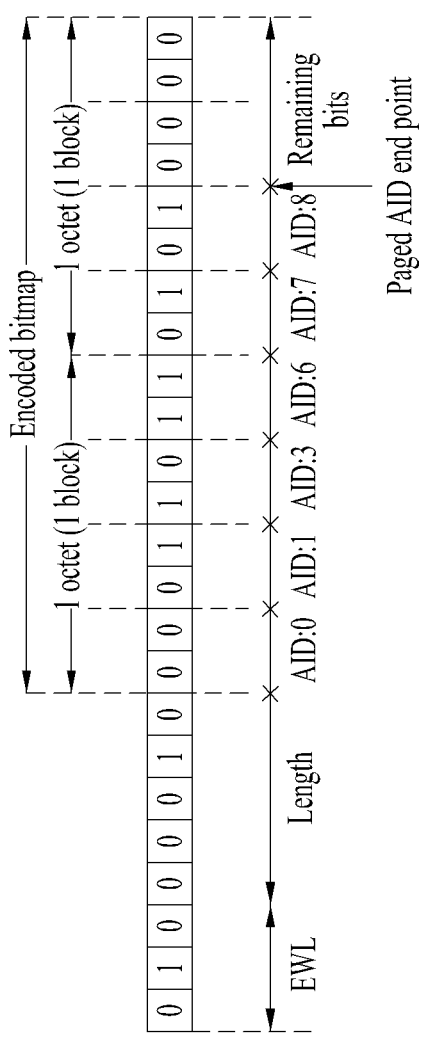
FIG. 23 illustrates a method for configuring a partial virtual bitmap in an ADE mode according to another embodiment of the present invention.

In the example of FIG. 23, since the first ΔAID field is set to 00, it indicates AID #0. Since the second ΔAID field is set to 01, it indicates AID #1 having a difference of 1 from the previous AID (i.e., AID #0). The third ΔAID field is set to 10, thus indicating AID #3 having a difference of 2 from the previous AID (i.e., AID #1). Since the fourth ΔAID field is set to 11, it indicates AID #6 having a difference of 3 from the previous AID (i.e., AID #3). The fifth ΔAID field is set to 01, thus indicating AID #7 having a difference of 1 from the previous AID (i.e., AID #6). The sixth ΔAID field is set to 01, thus indicating AID #8 having a difference of 1 from the previous AID (i.e., AID #7). In the example of FIG. 23, the seventh ΔAID field has a value of 00 and thus it is interpreted that the sixth ΔAID field indicates a delta value for the last AID.

In the case where 00 is defined as a value indicating the termination state in a ΔAID field, if both the first and second ΔAID fields are set to 0000, the first ΔAID field may indicate AID #0 and the second ΔAID field may indicate termination without any additional paged AID.

In an additional example, the termination state proposed by the present invention may be used for other purposes.

For example, if the size of a ΔAID field is large (i.e., the difference between $AID_i$ and $AID_{i-1}$ is large), the resulting increase in the size of an EWL field indicating the size of the ΔAID field may increase the overhead of a partial virtual bitmap significantly. Therefore, to prevent a significant increase in the value of ΔAID, a dummy ΔAID field may be inserted between ΔAID fields indicating actual paged AIDs, when needed. As a consequence, the increase of the sizes of the ΔAID field and the EWL field can be prevented.

For example, if the difference between $AID_i$ (=AID #10) and $AID_{i-1}$ (=AID#4) is 6, one ΔAID field should be at least 3 bits in size in order to represent the difference. On the other hand, if a dummy AID exists between $AID_i$ and $AID_{i-1}$, the size of the $\Delta AID$ field may be decreased to 2 bits. For example, if AID #7 is assumed to be a dummy AID between AID #4 and AID #10, the difference between AID #4 and AID #7 is 3 and the difference between AID #7 and AID #10 is 3. Thus, a 2-bit $\Delta AID$ is sufficient to represent the difference.

If a dummy $\Delta AID$ field indicating a dummy AID is inserted in this manner, the dummy AID is not the AID of an actually paged STA and thus an STA should not interpret the dummy AID as a paged AID. Therefore, if the $\Delta AID$ field following the dummy $\Delta AID$ is set to a predetermined value (e.g., 00), the $\Delta AID$ field previous to the $\Delta AID$ field having the predetermined value may be determined to be a dummy $\Delta AID$ field. That is, an STA receiving a partial virtual bitmap may determine that the $\Delta AID$ field previous to a $\Delta AID$ field set to the predetermined value is a dummy $\Delta AID$ field in an encoded bitmap and thus does not indicate the AID of a paged STA.

For the above operation, one of the states available to the $\Delta AID$ field may be preset as the predetermined value indicating a dummy $\Delta AID$ field, in addition to the state indicating the termination state. For example, if a $\Delta AID$ is 00, the previous $\Delta AID$ field may indicate an end point and if the $\Delta AID$ is 11, the previous $\Delta AID$ field may be a dummy $\Delta AID$ field.

However, the number of states available to represent actual delta values may be decreased due to assignment of two values to represent the termination state and the dummy $\Delta AID$ indication state, thus increasing inefficiency. For example, if the EWL field is set to 2 (i.e., the size of a $\Delta AID$ field is 2 bits), only two of four states may be allocated to indicate actual delta values. In this context, both the termination state and the dummy $\Delta AID$ indication state may be represented by one state value of the $\Delta AID$ field.

In this case, the last block (i.e., the last octet) of an encoded bitmap may suffer from decoding ambiguity. For example, it is assumed that the EWL field is set to 2 and 00 indicates both the termination state and the dummy $\Delta AID$ in a $\Delta AID$ field. Then if the encoded bitmap has a value of " . . . xx00 . . . " (xx is 01, 10, or 11), it may not be determined accurately from 00 whether xx is a dummy $\Delta AID$ or the end point of $\Delta AIDs$. To eliminate the obscurity, the following rule may be set and a partial virtual bitmap may be configured/interpreted according to this rule.

If successive $\Delta AID$ fields are set to a value indicating both the termination state and the dummy $\Delta AID$, a receiving STA interprets them as the termination state. For example, if an encoded bitmap has a value " . . . xx0000 . . . " (xx is 01, 10, or 11), it may be determined that xx indicates the end point of $\Delta AIDs$ because 00 occurs twice successively.

If a $\Delta AID$ field is set to a value indicating both the termination state and the dummy $\Delta AID$, without either the previous or next successive $\Delta AID$ field being set to the same value, a receiving STA interprets the $\Delta AID$ field as indicating the dummy $\Delta AID$. For example, if an encoded bitmap has a value " . . . xx00yy . . . " (each of xx and yy is 01, 10, or 11), it may be determined that xx indicates the dummy $\Delta AID$ because 00 occurs only once.

If the last bit set unit of an encoded bitmap is set to a value indicating both the termination state and the dummy $\Delta AID$, a receiving STA interprets the last bit set unit as indicating the termination state. For example, if an encoded bitmap has a value " . . . xx00" (xx is 01, 10, or 11), it may be determined that xx indicates a $\Delta AID$ endpoint because 00 is the last bit value.

Figure 24:
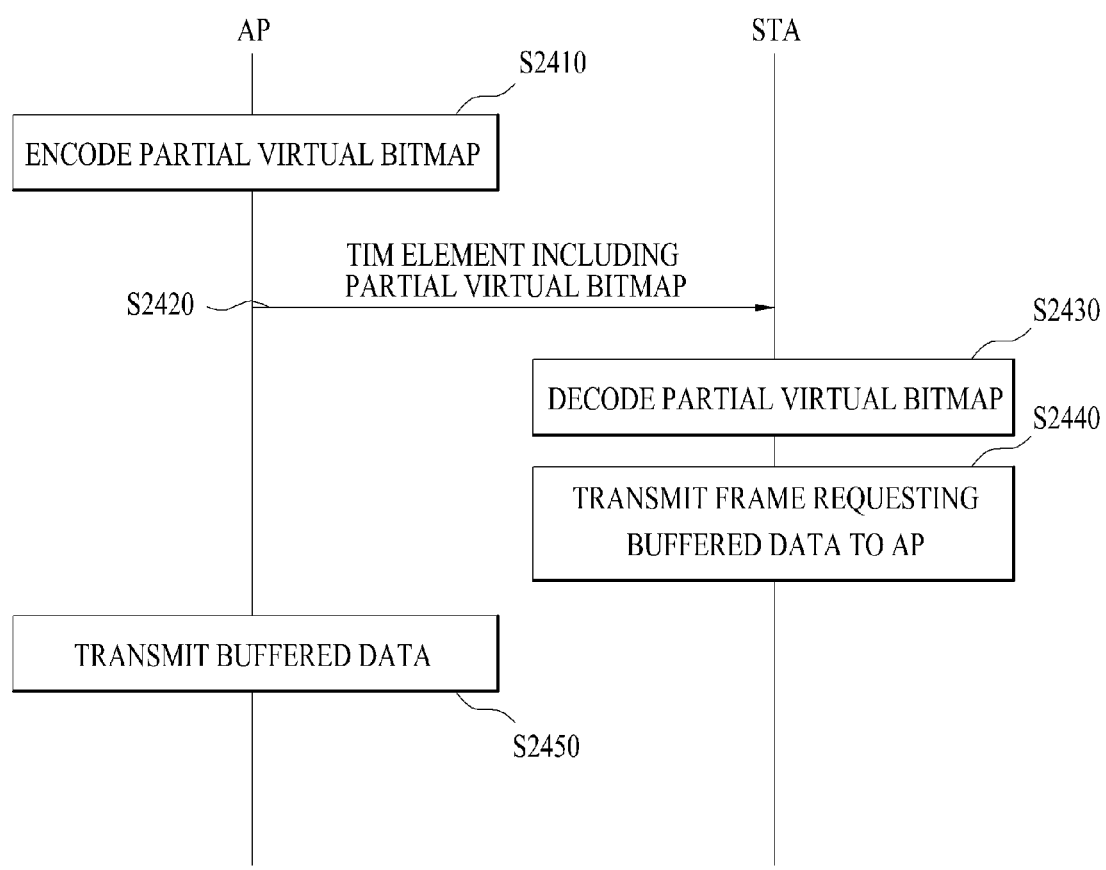
FIG. 24 illustrates an exemplary method according to the present invention.

FIG. 24 is a diagram illustrating a signal flow for an exemplary method according to the present invention.

Referring to FIG. 24, an AP may encode a partial virtual bitmap according to an ADE mode in step S2410. According to the present invention, information about the number of paged STAs, information about a termination state, etc. may be included explicitly or implicitly in the partial virtual bitmap.

In step S2420, the AP may transmit a TIM element including the partial virtual bitmap in a predetermined frame (e.g., a beacon frame) to an STA and the STA may receive the TIM element.

The STA may decode the partial virtual bitmap in step S2430. According to the present invention, the STA may clearly determine information about the number of $\Delta AIDs$ or information about a $\Delta AID$ endpoint based on the received information about the number of paged STAs or the termination state and thus decode the partial virtual bitmap without errors. If the decoded partial virtual bitmap indicates an AID identical to the AID of the STA, the STA may determine that data for the STA is buffered in the AP.

The STA may transmit a frame requesting the data buffered in the AP (e.g., a PS-Poll frame) to the AP in step S2440.

In step S2450, the AP may transmit the buffered data to the STA.

While the exemplary method of FIG. 24 is represented as a sequence of steps for clarity of description, this does not limit the sequence of steps. When needed, some of the steps may be performed simultaneously or in a different order. In addition, all of the steps illustrated in FIG. 24 are not mandatory to implement the method of the present invention.

The foregoing various embodiments of the present invention may be implemented individually or in combination of two or more in the method of the present invention illustrated in FIG. 24.

Figure 25:
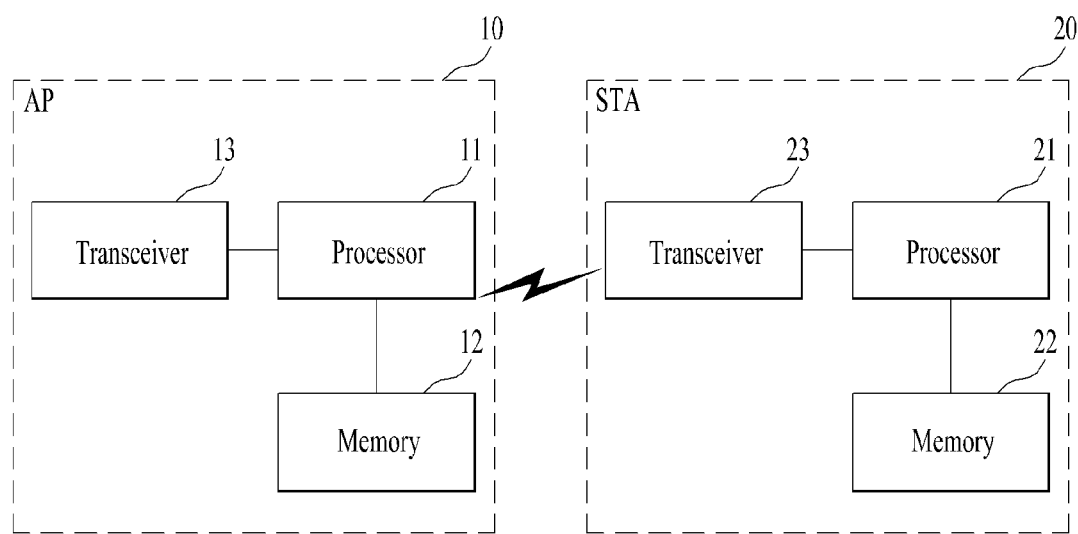
FIG. 25 is a block diagram of wireless apparatuses according to an embodiment of the present invention.

FIG. 25 is a block diagram of wireless apparatuses according to an embodiment of the present invention.

Referring to FIG. 25, an AP 10 may include a processor 11, a memory 12, and a transceiver 13. An STA 20 may include a processor 21, a memory 22, and a transceiver 23. The transceivers 13 and 23 may transmit/receive radio signals and may implement, for example, a physical layer of an IEEE 802 system. The processors 11 and 21 are connected to the transceivers 13 and 21, respectively, and may implement the physical layer and/or a MAC layer of the IEEE 802 system. The processors 11 and 21 may be configured to perform operations according to the above-described various embodiments of the present invention. Modules for implementing operations of the AP and STA according to the above-described various embodiments of the present invention may be stored in the memories 12 and 22 and executed by the processors 11 and 21. The memories 12 and 22 may be provided inside or outside the processors 11 and 21 and connected to the processors 11 and 21 by a known means.

The AP 10 may be configured to transmit a TIM element. The processor 11 may transmit a TIM element including an encoded partial virtual bitmap in a predetermined frame (e.g., a beacon frame) to the STA 20 through the transceiver 13. One block of the partial virtual bitmap includes one or more $\Delta AID$ fields and specific information of the partial virtual bitmap may indicate the end of the one or more $\Delta AID$ fields.

The STA 20 may be configured to receive a TIM element. The processor 21 may be configured to receive a frame including a TIM element through the transceiver 23. The processor 21 may be configured to decode a partial virtual bitmap included in the TIM element. One block of the partial virtual bitmap includes one or more ΔAID fields and specific information of the partial virtual bitmap may indicate the end of the one or more ΔAID fields. Accordingly, the STA 20 may decode the partial virtual bitmap without errors and determine whether data for the STA 20 is buffered in the AP 10. If determining that data for the STA 20 is buffered in the AP 10, the STA 20 may transmit a frame requesting the buffered data to the AP 10.

The AP 10 and the STA 20 illustrated in FIG. 25 may be configured so that the above-described various embodiments of the present invention are implemented independently or in combination of two or more. A redundant description is omitted for clarity.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 system, they are applicable in the same manner to many other mobile communication systems.

The invention claimed is:

1. A method for receiving a Traffic Indication Map (TIM) element by a Station (STA) in a Wireless Local Area Network (WLAN) system, the method comprising:
   receiving a frame including the TIM element from an Access Point (AP); and
   decoding a partial virtual bitmap included in the TIM element,
   wherein one block of the partial virtual bitmap includes an Encoding Word Length (EWL) field, a Length field, one or more Association Identifier (ΔAID) Differential Value fields, and a field following the one or more ΔAID Differential Value fields, and
   wherein the decoding is stopped for the one block of the partial virtual bitmap based on an indication in the one block.

2. The method according to claim 1, wherein the field following the one or more ΔAID Differential Value fields is a padding field.

3. The method according to claim 2, wherein the padding field has a value of 0.

4. The method according to claim 1, wherein the partial virtual bitmap includes one or more blocks, and each of the one or more blocks is encoded in an AID Differential Encode (ADE) mode.

5. The method according to claim 4, wherein each of the one or more blocks has a length of a plurality of octets.

6. The method according to claim 1, wherein the decoding is stopped when a ΔAID Differential Value field other than a first ΔAID Differential Value field among the one or more ΔAID Differential Value fields has a predetermined value.

7. The method according to claim 6, wherein the predetermined value is 0.

8. The method according to claim 1, wherein whether or not data for the STA is buffered in the AP is determined based on the partial virtual bitmap.

9. The method according to claim 8, wherein when an AID indicated by the partial virtual bitmap corresponds to an AID of the STA, data for the STA is determined to be buffered in the AP.

10. The method according to claim 9, wherein when the data for the STA is determined to be buffered in the AP, a frame requesting the data is transmitted to the AP by the STA.

11. The method according to claim 1, wherein the frame including the TIM element is a beacon frame.

12. A method for transmitting a Traffic Indication Map (TIM) element by an Access Point (AP) in a Wireless Local Area Network (WLAN) system, the method comprising:
    encoding a partial virtual bitmap; and
    transmitting the TIM element including the encoded partial virtual bitmap to a Station (STA),
    wherein one block of the partial virtual bitmap includes an Encoding Word Length (EWL) field, a Length field, one or more Association Identifier (ΔAID) Differential Value fields, and a field following the one or more ΔAID Differential Value fields, and
    wherein the one block of the partial virtual bitmap includes an indication to stop decoding the one block.

13. A Station (STA) for receiving a Traffic Indication Map (TIM) element in a Wireless Local Area Network (WLAN) system, the STA comprising:
    a transceiver; and
    a processor,
    wherein the processor is configured to receive a frame including the TIM element from an Access Point (AP) through the transceiver, and to decode a partial virtual bitmap included in the TIM element,
    wherein one block of the partial virtual bitmap includes an Encoding Word Length (EWL) field, a Length field, one or more Association Identifier (ΔAID) Differential Value fields, and a field following the one or more ΔAID Differential Value fields, and
    wherein the processor stops decoding the one block of the partial virtual bitmap based on an indication in the one block.

14. An Access Point (AP) for transmitting a Traffic Indication Map (TIM) element in a Wireless Local Area Network (WLAN) system, the AP comprising:
  a transceiver; and
  a processor,
  wherein the processor is configured to encode a partial virtual bitmap, and to transmit the TIM element including the encoded partial virtual bitmap to a Station (STA) through the transceiver,
  wherein one block of the partial virtual bitmap includes an Encoding Word Length (EWL) field, a Length field, one or more Association Identifier ($\Delta$AID) Differential Value fields, and a field following the one or more $\Delta$AID Differential Value fields, and
  wherein the one block of the partial virtual bitmap includes an indication to stop decoding the one block.

* * * * *